(12) United States Patent
Zhao et al.

(10) Patent No.: US 10,803,588 B2
(45) Date of Patent: Oct. 13, 2020

(54) METHOD AND SYSTEM FOR DETERMINING A VOLUME OF INTEREST

(71) Applicant: SHANGHAI UNITED IMAGING HEALTHCARE CO., LTD., Shanghai (CN)

(72) Inventors: Enwei Zhao, Shanghai (CN); Zhenzhong Liu, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 75 days.

(21) Appl. No.: 16/024,627

(22) Filed: Jun. 29, 2018

(65) Prior Publication Data

US 2019/0005648 A1 Jan. 3, 2019

(30) Foreign Application Priority Data

Jun. 30, 2017 (CN) .......................... 2017 1 0563452

(51) Int. Cl.
*G06T 7/00* (2017.01)
*G06K 9/32* (2006.01)
(Continued)

(52) U.S. Cl.
CPC ........ *G06T 7/0016* (2013.01); *G06K 9/00208* (2013.01); *G06K 9/3233* (2013.01); *G06K 9/3241* (2013.01); *G06K 9/4604* (2013.01); *G06T 7/33* (2017.01); *G06T 7/564* (2017.01); *G06T 7/62* (2017.01); *G06T 15/08* (2013.01); *G06K 2209/051* (2013.01); *G06T 2200/04* (2013.01); *G06T 2207/10081* (2013.01); (Continued)

(58) Field of Classification Search
None
See application file for complete search history.

(56) References Cited

U.S. PATENT DOCUMENTS

2009/0169076 A1 7/2009 Lobregt et al.
2012/0293514 A1* 11/2012 Virtue ..................... G06T 7/174
345/424
(Continued)

FOREIGN PATENT DOCUMENTS

CN 102908142 A 2/2013
CN 103745501 A 4/2014
(Continued)

*Primary Examiner* — Fan Zhang
(74) *Attorney, Agent, or Firm* — Metis IP LLC

(57) ABSTRACT

A system includes a storage device storing a set of instructions and a processor in communication with the storage device. When executing the set of instructions, the processor is configured to cause the system to obtain a 3D image including a plurality of 2D images, the 3D image relating to a lesion of an object and determine a preliminary VOI in the 3D image. The processor is also configured to cause the system to determine a preliminary shape based on an intersection of the preliminary VOI and a 2D target image of the plurality of 2D images and determine a transformation matrix corresponding to an operation to transform the preliminary shape to a target shape relating to the 3D ROI. The processor is further also configured to cause the system to determine a transformed VOI based on the preliminary VOI and the transformation matrix.

18 Claims, 15 Drawing Sheets

(51) Int. Cl.
*G06T 7/62* (2017.01)
*G06T 15/08* (2011.01)
*G06T 7/564* (2017.01)
*G06K 9/46* (2006.01)
*G06T 7/33* (2017.01)
*G06K 9/00* (2006.01)

(52) U.S. Cl.
CPC ............... *G06T 2207/10088* (2013.01); *G06T 2207/10104* (2013.01); *G06T 2207/20104* (2013.01); *G06T 2207/30096* (2013.01); *G06T 2210/12* (2013.01)

(56) References Cited

U.S. PATENT DOCUMENTS

| | | | |
|---|---|---|---|
| 2013/0322716 A1* | 12/2013 | Wollenweber | A61B 6/469 382/131 |
| 2014/0193053 A1* | 7/2014 | Kadoury | G06T 15/08 382/131 |
| 2015/0235358 A1* | 8/2015 | Momose | G06T 7/0012 382/131 |
| 2018/0156883 A1* | 6/2018 | Oz | G01R 33/5608 |
| 2018/0344290 A1* | 12/2018 | Veronesi | G06T 7/00 |
| 2020/0074636 A1* | 3/2020 | Ouji | G06T 7/174 |

FOREIGN PATENT DOCUMENTS

| | | |
|---|---|---|
| CN | 104376552 A | 2/2015 |
| CN | 106611416 A | 5/2017 |

\* cited by examiner

METHOD AND SYSTEM FOR DETERMINING A VOLUME OF INTEREST

CROSS-REFERENCE TO RELATED APPLICATIONS

This application claims priority to Chinese Application No. 201710563452.4 filed on Jun. 30, 2017, the contents of which are hereby incorporated by reference.

TECHNICAL FIELD

The present disclosure generally relates to image processing, and more particularly, a system and method for determining a volume of interest in an image.

BACKGROUND

To track a lesion (including, e.g., a localized area of disease or the chief site of a generalized disease or infection, an area of a defect) of an object corresponding to a region of interest (ROI) in an image, a shape enclosing the ROI in the image corresponding to the lesion may be drawn in a (two-dimensional) plane within the image. A three-dimensional volume of interest (VOI) may be obtained based on the shape. The VOI may be analyzed for obtaining information relating to the lesion or segmenting, based on the VOI, a portion of the image corresponding to the lesion to facilitate, e.g., inspection (e.g., internal defect inspection), diagnosis, treatment, etc. However, if the VOI corresponds to only a part of the lesion, information regarding the lesion acquired by analyzing the VOI including an incomplete lesion, or segmenting a portion of the image corresponding to the lesion may be inaccurate. It is desirable to develop a system and method for determining a volume of interest in an image that corresponds to a lesion of an object.

SUMMARY

According to an aspect of the present disclosure, a system may include a storage device storing a set of instructions and at least one processor in communication with the storage device. When executing the instructions, the at least one processor may be configured to cause the system to obtain a three-dimensional (3D) image including a plurality of two-dimensional (2D) images and determine a preliminary VOI in the 3D image. In some embodiments, the 3D image may relate to a 3D region of interest (ROI) corresponding to a lesion of an object. The preliminary VOI may correspond to the 3D ROI. The at least one processor may be also cause the system to determine a preliminary shape based on an intersection of the preliminary VOI and a 2D target image of the plurality of 2D images and determine a transformation matrix corresponding to an operation to transform the preliminary shape to a target shape relating to the 3D ROI. The at least one processor may be further cause the system to determine a transformed VOI based on the preliminary VOI and the transformation matrix and determine information relating to the lesion of the object based on the transformed VOI.

In some embodiments, the at least one processor may also cause the system to identify, from the plurality of 2D images, a 2D image with a 2D ROI corresponding to the lesion and determine a target contour corresponding to the lesion in a 2D plane of the 2D image with the lesion. The at least one processor may further cause the system to determine the preliminary VOI based on the target contour.

In some embodiments, the at least one processor may also cause the system to generate one or more intersecting shapes based on the preliminary VOI and the plurality of 2D images and for each of the one or more intersecting shapes in a 2D image, determine a difference based on the intersecting shape and the corresponding 2D ROI in the 2D image. In some embodiments, each of the one or more intersecting shapes may correspond to a 2D ROI in each of at least one 2D image of the plurality of 2D images. The at least one processor may also cause the system to determine a ranking result by ranking the one or more differences and determine the target 2D image based on the ranking result. The at least one processor may also cause the system to determine the preliminary shape based on an intersection of the preliminary VOI and the target 2D image.

In some embodiments, the at least one processor may also cause the system to determine one or more differences in area between the one or more intersecting shapes and the 2D ROIs and determine the ranking result based on the one or more differences in area In some embodiments, the target 2D image may correspond to the largest difference in area among the determined one or more differences in area between the one or more intersecting shapes and the 2D ROIs.

In some embodiments, the at least one processor may also cause the system to determine the transformation matrix based on the preliminary shape and the target shape.

In some embodiments, the at least one processor may also cause the system to determine a plurality of preliminary shapes and a plurality of corresponding 2D target images of the plurality of 2D images.

In some embodiments, the at least one processor may also cause the system to, for each of the plurality of preliminary shapes, determine a corresponding matrix that transforms the each preliminary shape to a corresponding target shape and determine the transformation matrix by performing a weighting operation with respect to the plurality of corresponding matrices.

In some embodiments, the at least one processor may also cause the system to determine information relating to the transformed VOI.

In some embodiments, the information relating to the transformed VOI may include at least one of voxel values of voxels in the transformed VOI, a largest voxel value of voxels in the transformed VOI, a volume of the 3D ROI, and/or a grey-scale histogram relating to the 3D ROI.

In some embodiments, the at least one processor may also cause the system to provide the information to a user device that generates a presentation based on at least a portion of the information on a graphic user interface displayed on the user device.

In some embodiments, the operation may include at least one of a translation operation, a rotation operation, and/or a zooming operation.

In some embodiments, the transformation matrix may include at least one of a translation matrix, a rotation matrix, and/or a zooming matrix.

In some embodiments, the translation matrix may relate to the translation operation.

In some embodiments, the rotation matrix may relate to the rotation operation.

In some embodiments, the zooming matrix may relate to the zooming operation.

In some embodiments, the at least one processor may also cause the system to communicate with a user device that generates a presentation relating to the communication on a graphic user interface displayed on the user device.

In some embodiments, the at least one processor may also cause the system to receive, via the graphic user interface, a user instruction relating to at least one of the 3D region of interest (ROI) corresponding to a lesion of an object, the 3D image, the plurality of 2D images, the preliminary VOI, the preliminary shape, the 2D target image, the target shape, the transformation matrix, and/or the transformed VOI.

According to another aspect of the present disclosure, a method implemented on at least one computing device each of which has one or more processors and one or more storage devices is provided. The method may include obtaining a three-dimensional (3D) image including a plurality of two-dimensional (2D) images and determining a preliminary VOI in the 3D image. In some embodiments, the 3D image may relate to a 3D region of interest (ROI) corresponding to a lesion of an object. The preliminary VOI may correspond to the 3D ROI. The method may also include determining a preliminary shape based on an intersection of the preliminary VOI and a 2D target image of the plurality of 2D images and determining a transformation matrix corresponding to an operation to transform the preliminary shape to a target shape relating to the 3D ROI. The method may further include determining a transformed VOI based on the preliminary VOI and the transformation matrix and determining information relating to the lesion of the object based on the transformed VOI.

According to yet another aspect of the present disclosure, a non-transitory computer-readable medium may store instructions. When executed by at least one processor of a system, the instructions may cause the system to obtain a three-dimensional (3D) image including a plurality of two-dimensional (2D) images and determine a preliminary VOI in the 3D image. In some embodiments, the 3D image may relate to a 3D region of interest (ROI) corresponding to a lesion of an object. The preliminary VOI may correspond to the 3D ROI. The instructions may also cause the system to determine a preliminary shape based on an intersection of the preliminary VOI and a 2D target image of the plurality of 2D images and determine a transformation matrix corresponding to an operation to transform the preliminary shape to a target shape relating to the 3D ROI. The instructions may further cause the system to determine a transformed VOI based on the preliminary VOI and the transformation matrix and determine information relating to the lesion of the object based on the transformed VOI.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the terms "system," "engine," "unit," "module," and/or "block" used herein are one method to distinguish different components, elements, parts, sections or assembly of different levels in ascending order. However, the terms may be displaced by another expression if they achieve the same purpose.

Figure 2:
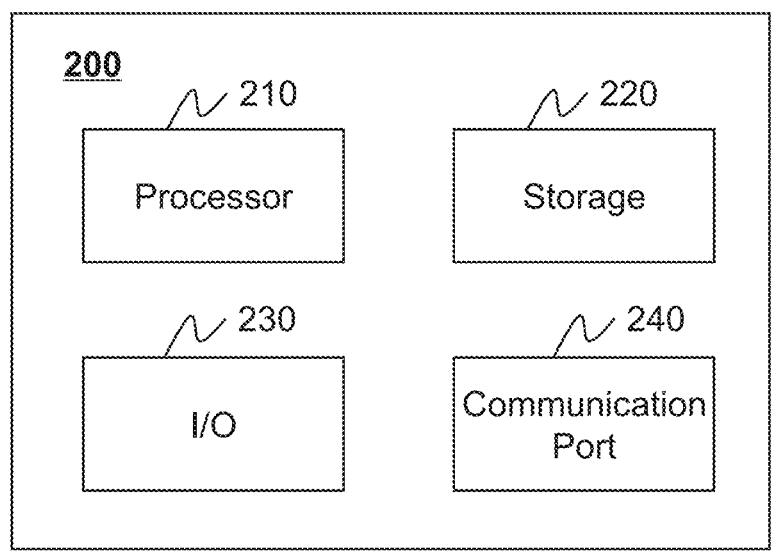
FIG. 2 is a schematic diagram illustrating exemplary hardware and/or software components of an exemplary computing device on which the processing engine may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

For illustration purposes, the following description is provided to help better understanding an imaging process. It is understood that this is not intended to limit the scope of the present disclosure. For persons having ordinary skills in the art, a certain amount of variations, changes and/or modifications may be deducted under the guidance of the present disclosure. Those variations, changes and/or modifications do not depart from the scope of the present disclosure.

For brevity, an image, or a portion thereof (e.g., a VOI or an ROI in the image) corresponding to an object (e.g., a tissue, an organ, a tumor, etc., of a subject (e.g., a patient, etc.)) may be referred to as an image, or a portion of thereof (e.g., a VOI, an ROI) of or including the object, or the object itself. For instance, a VOI or an ROI corresponding to the image of a liver may be described as that the VOI or the ROI includes a liver. As another example, an image of or including a liver may be referred to a liver image, or simply liver. For brevity, that a portion of an image corresponding to an object is processed (e.g., extracted, segmented, etc.) may be described as the object is processed. For instance, that a portion of an image corresponding to a liver is extracted or segmented from the image may be described as that the liver is extracted or segmented.

The present disclosure relates to a method and system for determining a volume of interest (VOI) in an image that encloses a three-dimensional (3D) region of interest (ROI) in the image. A 3D image including a plurality of 2D images may be obtained. The 3D image may include a 3D ROI corresponding to a lesion of an object. A preliminary VOI relating to the ROI may be determined. A preliminary shape may be determined based on an intersection of the preliminary VOI and a 2D target image of the plurality of 2D images. A target shape may be determined by performing a transformation operation on the preliminary shape. A transformation matrix may be determined based on the transformation operation. A transformed VOI may be determined based on the preliminary VOI and the transformation matrix. The transformed VOI may completely enclose the 3D ROI.

Figure 1A:
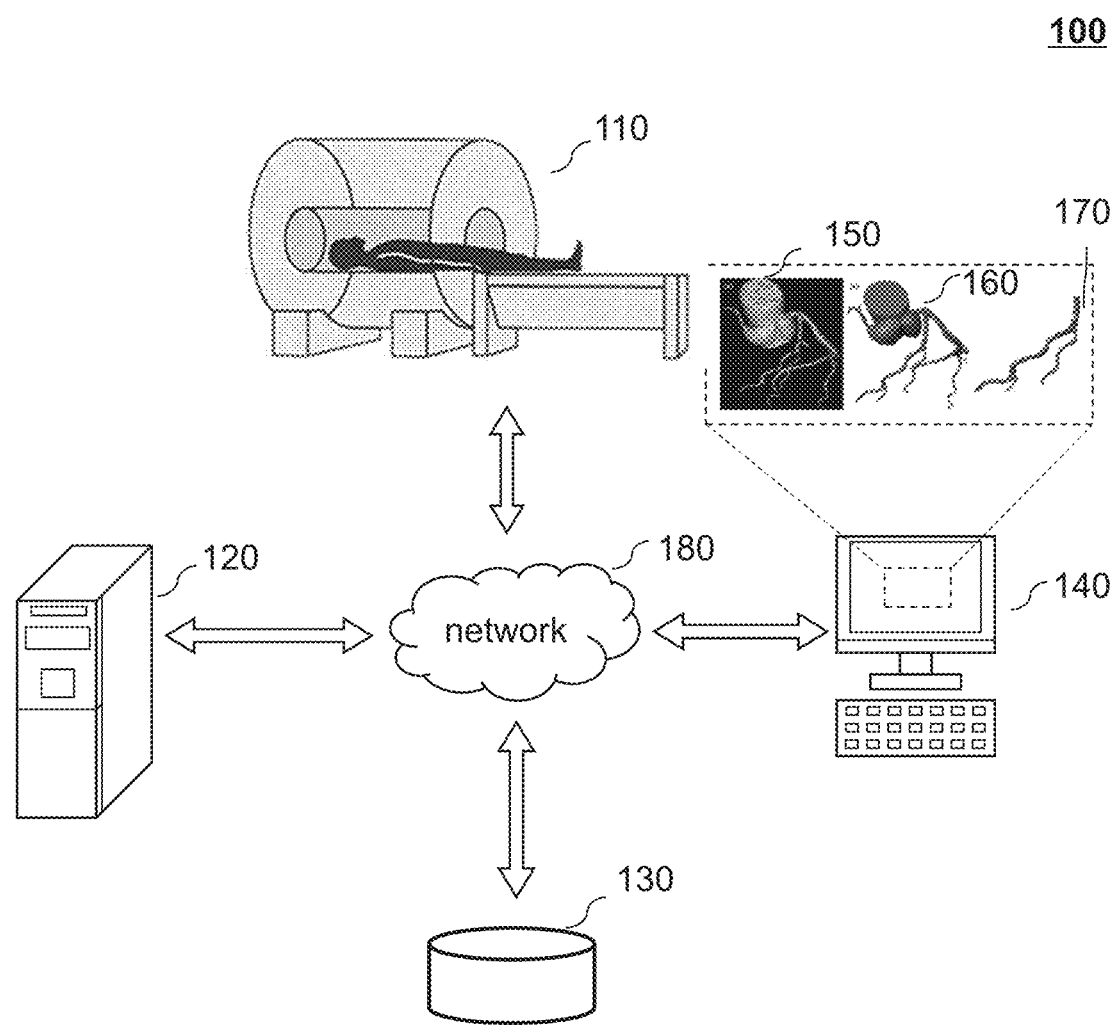
FIG. 1A illustrates a schematic diagram of an image processing system according to some embodiments of the present disclosure.

FIG. 1A illustrates a schematic diagram of an image processing system 100 according to some embodiments of the present disclosure. The image processing system 100 may include a data collection device 110, a processing device 120, a storage device 130, and a communication device 140. The data collection device 110, the processing device 120, the storage device 130, and the communication device 140 may communicate with each other via a network 180.

The data collection device 110 may be configured to collect data. The data may include image data. In some embodiments, the data collection device 110 may include an imaging device. The imaging device may collect the image data. The imaging device may generate an image based on the image data. The image may be formed by the detection of, e.g., an electrical signal, an optical signal, rays, particles, etc. The imaging device may be a magnetic resonance imaging (MRI) device, a computed tomography (CT) device, a positron emission computed tomography (PET) device, or the like, or any combination thereof. The image data may include images or data of a blood vessel, a tissue, or an organ of an object. In some embodiments, the data collection device 110 may send the collected data to the processing device 120, the storage device 130, and/or the communication device 140 via the network 180.

The processing device 120 may process data and/or an image. The data may be collected by the data collection device 110. The image may be generated by the data collection device 110. The data and/or the image may also be obtained from the storage device 130, the communication device 140 (e.g., input data of a user), or from a cloud or an external device via the network 180. In some embodiments, the data may include image data, user input, etc. The image may include a plurality of two-dimensional images. The processing the image may include transforming a VOI in the image relating to a region of interest of the image. The region of interest may be selected solely by the processing device 120 automatically, or selected based on user input. In some embodiments, the region of interest may correspond to a lesion or a part of an object including a blood vessel, a tissue, an organ, etc. The processing device 120 may obtain information relating to the region of interest by analyzing the VOI in the image. The information may include statistic information including, e.g., pixel values of pixels, voxel values of voxels, a volume of a 3D ROI (relating to the volume of a lesion), grey-scale histogram, etc. The processing device 120 may further segment the region of interest in the VOI. The technique of image segmentation may include a technique based on edges (e.g., a Perwitt operator, a Sobel operator, a gradient operator, a Kirch operator, etc.), a technique based on regions (e.g., a region growing technique, a threshold technique, a clustering technique, etc.), or other techniques based on fuzzy sets, a neural network, etc.

In some embodiments, the processing device 120 may denoise or smooth obtained data or a processing result. In some embodiments, the processing device 120 may send the image or the processing result to the storage device 130 for storing, or the communication device 140 for display and/or distribution. The processing result may be an intermediate result generated in the process (e.g., a model of a region of interest), or a final result of the process (e.g., an analyzed and computed hemodynamic parameter, etc.). In some embodiments, the processing device 120 may include one or more processing units or devices, such as central processing units (CPUs), graphics processing units (GPUs), digital signal processors (DSPs), systems on a chip (SoC), microcontroller units (MCUs), etc. In some embodiments, the processing device 120 may be a specially designed processing unit or device with specific functions. The processing device 120 may be local, or remote with respect to the data collection device 110.

The storage device 130 may store data or information. The data or information may include data obtained by the data collection device 110, processing results or control instructions generated by the processing device 120, user input received by the communication device 140, etc. The storage device 130 may be one or more storage mediums with read/write functions. The storage device 130 may include but not limited to a static random access memory (SRAM, a random-access memory (RAM), a read-only memory (ROM), a hard disk, a flash memory, etc. In some embodiments, the storage device 130 may be a remote storage device, such as a cloud disk, etc.

The communication device 140 may be configured to receive, send, and/or display data or information. The received data or information may include the data obtained by the data collection device 110, the processing results generated by the processing device 120, the data stored in the storage device 130, etc. For example, the data or information displayed by the communication device 140 may include an actual image 150 of a cardiovascular system or a portion thereof obtained by the data collection device 110, a cardiovascular model 160 reconstructed by the processing device 120 based on the actual image 150, a coronary artery model extracted from the cardiovascular model 160 by the processing device 120, etc. The formats of display may include a two-dimensional or three-dimensional image, a geometric model and its grid processed result, a vector diagram (e.g., a velocity vector), a contour map, a filled contour map (cloud chart), an XY scatter plot, a particle trajectory map, a simulated flow effect, or the like, or any combination thereof. As another example, the data or information sent by the communication device 140 may include information provided by a user. The communication device 140 may receive one or more operating parameters of the processing device 120 input by the user, and send the operating parameters to the processing device 120.

In some embodiments, the communication device 140 may include a graphic user interface. The user may provide a user input to the communication device 140 by specific interactive apparatuses such as a mouse, a keyboard, a touchpad, a microphone, etc. For example, the user may click on the image displayed by the communication device 140 and select a volume of interest of the image.

In some embodiments, the communication device 140 may be a device with a display function, such as a screen. In some embodiments, the communication device 140 may have some or all functions of the processing device 120. For example, the communication device 140 may implement operations (e.g., smoothing, denoising, changing colors, transforming a shape, etc.) to information or data collected by the data collection device 110, generated by the processing device 120, retrieved from a storage device (e.g., the storage device 130), or the like, or a combination thereof. Merely by way of example, the operation of transforming a shape may include translation, rotation, and zooming. The integrated device may implement functions of both the processing device 120 and the communication device 140. In some embodiments, the communication device 140 may include a desktop computer, a server, a mobile device, etc. The mobile device may include a laptop computer, a tablet computer, an iPad, a built-in device of a vehicle (e.g., a motor vehicle, a ship, an airplane), a wearable device, etc. In some embodiments, the communication device 140 may include or is connected to a display apparatus, a printer, a fax machine, etc.

The network 180 may be used for internal communication of the image processing system 100. The network 180 may also be configured to receive information from or send information to the external devices outside the image processing system 100. In some embodiments, the data collection device 110, the processing device 120, and the communication device 140 may be connected to the network 180 via a wired connection, a wireless connection, or a combination thereof. The network 180 may be a single network or a combination of networks. In some embodiments, the network 180 may include but is not limited to a local area network (LAN), a wide area network (WAN), a public network, a proprietary network, a wireless local area network (WLAN), a virtual network, an urban metropolitan area network, a public switched telephone network (PSTN), or the like, or any combination thereof. In some embodiments, the network 180 may include multiple network access points, such as a wired or wireless access point, a base station or network switched point, etc. Through these access points, any data source may be connected to the network 180 and transmit information via the network 180.

Figure 1B:
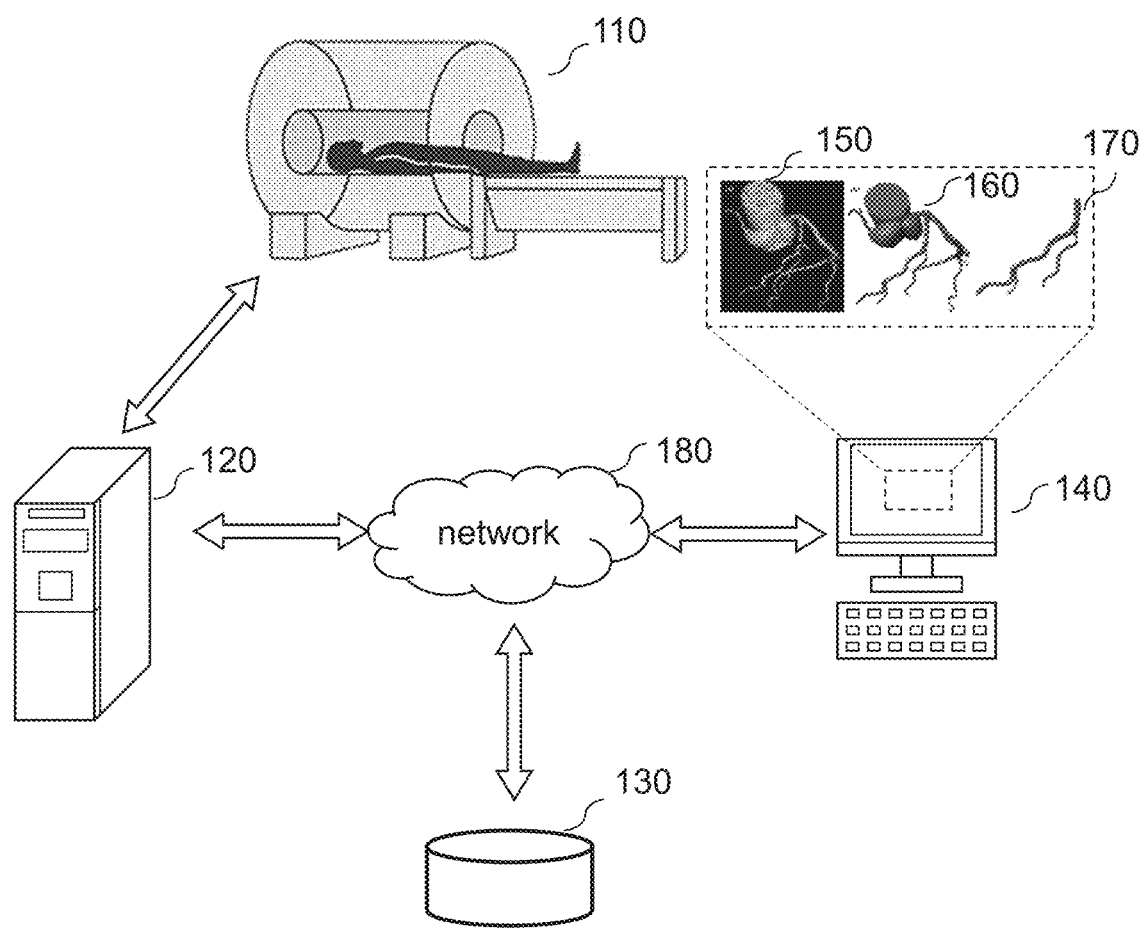
FIG. 1B illustrates a schematic diagram of an image processing system according to some embodiments of the present disclosure.

FIG. 1B illustrates another schematic diagram of a network environment including an image processing system 100 according to some embodiments of the present disclosure. FIG. 1B is similar to FIG. 1A. In FIG. 1B, the processing device 120 may be directly connected to the data collection device 110. The data collection device 110 is not directly connect to the network 180.

The above description of the present disclosure is provided for the purposes of illustration, and not intended to limit the scope of the present disclosure. For persons having ordinary skills in the art, modules may be combined in various ways, or connected with other modules as subsystems. Various variations and modifications may be conducted under the teaching of the present disclosure. However, those variations and modifications may not depart the spirit and scope of this disclosure. For example, the data collection device 110, the processing device 120, and the communication device 140 may directly exchange information with each other without the network 180. As another example, the devices may exchange information by a removable storage device or another intermediate medium.

FIG. 2 is a schematic diagram illustrating exemplary hardware and/or software components of an exemplary computing device 200 on which the processing device 120 may be implemented according to some embodiments of the present disclosure. As illustrated in FIG. 2, the computing device 200 may include a processor 210, a storage 220, an input/output (I/O) 230, and a communication port 240.

The processor 210 may execute computer instructions (e.g., program code) and perform functions of the processing device 120 in accordance with techniques described herein. The computer instructions may include, for example, routines, programs, objects, components, data structures, procedures, modules, and functions, which perform particular functions described herein. For example, the processor 210 may process image data obtained from the data collection device 110, the storage device 130, and/or any other component of the image processing system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combination thereof.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage 220 may store data/information obtained from the data collection device 110, the storage device 130, and/or any other component of the image processing system 100. In some embodiments, the storage 220 may include a mass storage device, a removable storage device, a volatile read-and-write memory, a read-only memory (ROM), or the like, or any combination thereof. For example, the mass storage may include a magnetic disk, an optical disk, a solid-state drive, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing device 120 for determining a regularization item.

The I/O 230 may input and/or output signals, data, information, etc. In some embodiments, the I/O 230 may enable a user interaction with the processing device 120. In some embodiments, the I/O 230 may include an input device and an output device. Examples of the input device may include a keyboard, a mouse, a touch screen, a microphone, or the like, or any combination thereof. Examples of the output device may include a display device, a loudspeaker, a printer, a projector, or the like, or any combination thereof. Examples of the display device may include a liquid crystal display (LCD), a light-emitting diode (LED)-based display, a flat panel display, a curved screen, a television device, a cathode ray tube (CRT), a touch screen, or the like, or any combination thereof.

The communication port 240 may be connected to a network (e.g., the network 180) to facilitate data communications. The communication port 240 may establish connections between the data collection device 110, the processing device 120, and/or the storage device 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or any combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
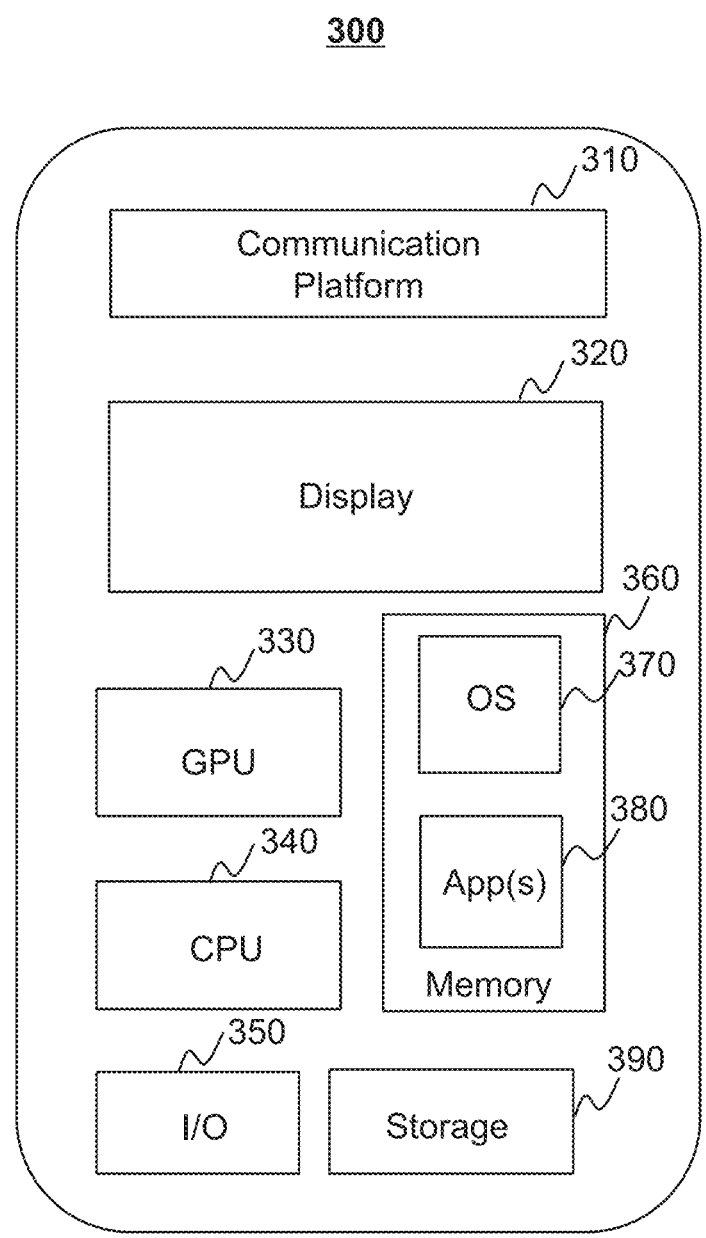
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which the communication device 140 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and storage 390. In some embodiments, any other suitable component including, e.g., a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information with respect to image processing or other information from the processing device 120. User interactions with the information stream may be achieved via the I/O 350 and provided to the processing device 120 and/or other components of the image processing system 100 via the network 180.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or external device. A computer may also act as a server if appropriately programmed.

Figure 4:
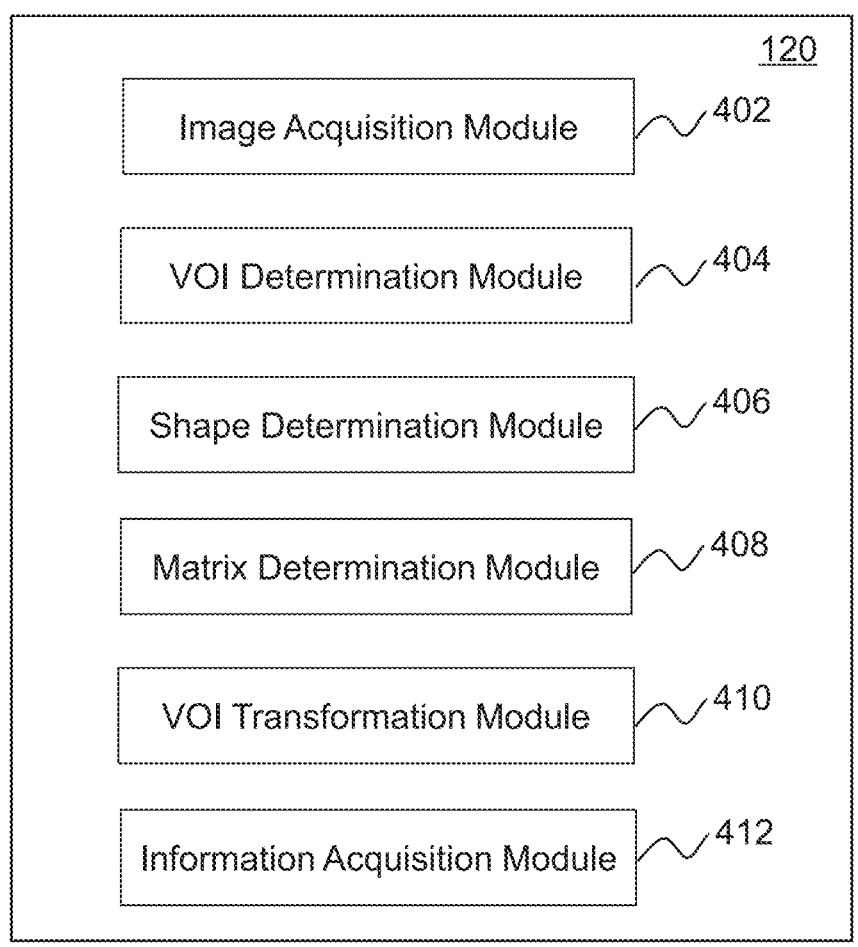
FIG. 4 is a schematic diagram illustrating an exemplary processing device according to some embodiments of the present disclosure.

FIG. 4 is a schematic diagram illustrating an exemplary processing device 120 according to some embodiments of the present disclosure. The processing device 120 may include an image acquisition module 402, a VOI determination module 404, a shape determination module 406, a matrix determination module 408, a VOI transformation module 410, and an information acquisition module 412. At least a portion of the processing device 120 may be implemented on a computing device as illustrated in FIG. 2 or a mobile device as illustrated in FIG. 3.

The image acquisition module 402 may obtain a 3D image. The 3D image may be generated by the data collection device 110 or retrieved from a storage device (e.g., the storage device 130, the storage 220, the storage 390). The 3D image may include a plurality of 2D images. Merely by way of ex, each 2D image may be a computed tomography (CT) image slice, a magnetic resonance imaging (MRI) image slice, a positron emission tomography (PET) image slice, or the like. The 3D image may include a 3D ROI of an object. The 3D ROI may be associated with a lesion of an object (e.g., a patient). The lesion may include, e.g., a localized area of disease, a chief site of a generalized disease or infection, an area of a defect, or the like, or a combination.

In some embodiments, the 3D ROI may be determined based on a user input. For instance, the 3D image including a 3D ROI corresponding to a lesion of an object (e.g., a patient) may be presented to a user (e.g., a doctor, an imaging specialist); the user may be prompted or allowed to draw at least a portion of a boundary of the 3D ROI via, e.g., a graphic user interface of the system 100. The 3D ROI may be defined by the portion of the boundary provided by the user alone, or in combination of a portion of the boundary determined, according to an algorithm, by the system 100 on the basis of the portion provided by the user.

Exemplary algorithms for determining at least a portion of the boundary of a 3D ROI may include image segmentation algorithms, machine learning algorithms, deep learning algorithms, or the like, or a combination thereof. Such exemplary algorithms may be used to obtain the 3D ROI through automatic detection, from which information relating to the lesion may be obtained. Exemplary image segmentation algorithms may include those based on boundary and/or cluster analysis such as boundary detection, feature extraction (e.g., stripe extraction), morphological filtering, shape template construction, template matching, threshold segmentation, or the like, or a combination thereof. Exemplary machine learning algorithms may include decision tree learning, association rule learning, artificial neural network, inductive logic programming, or the like, or a combination thereof. Exemplary deep learning algorithms may include stacked auto-encoder (SAE), deep belief network (DBN), deep Boltzmann machine (DBM), convolutional neural network (CNN), recurrent neural network (RNN), or the like, or a combination thereof.

In some embodiments, the image acquisition module 402 may include an image reconstruction unit (not shown). The image reconstruction unit may obtain imaging data from the data collection device 110 and/or a storage device including, e.g., the storage device 130. The image reconstruction unit may reconstruct an image based on the imaging data. The image may be a 3D image including a CT image, a PET image, an MRI image, etc.

The VOI determination module 404 may determine a preliminary VOI in the 3D image. The preliminary VOI may correspond to the 3D ROI. In some embodiments, the preliminary VOI may include at least part of the 3D ROI. In some embodiments, the VOI determination module 404 may identify a 2D image from the plurality of 2D images of the 3D image. The 2D image may include a 2D ROI. The 2D ROI may be determined based on the intersection of the 3D ROI and the 2D image. The VOI determination module 404 may determine a contour relating to the 2D ROI in a 2D image. For instance, the VOI determination module 404 may determine a contour (e.g., an oval, a circle, a rectangle, a polygon, etc.) completely enclosing the 2D ROI. In some embodiments, the contour may enclose only a portion of the 2D image. In some embodiments, the contour may be slightly larger than the 2D ROI. For instance, if a dimension of the contour is decreased by, e.g., no more than 5%, 10%, 15%, or 20%, or the like, the resulting shrunken contour encloses only part of the 2D ROI. Merely by way of example, the contour is an oval having a long axis and a short axis; if the dimension of the contour along the long axis is decreased (e.g., by no more than 5%, 10%, 15%, 20%, 25%, or 30%), the resulting shrunken contour encloses only part of the 2D ROI; if the dimension of the contour along the short axis is decreased (e.g., by no more than 5%, 10%, 15%, 20%, 25%, or 30%), the resulting shrunken contour encloses only part of the 2D ROI. For each of at least one of the plurality of 2D images, a contour may be determined accordingly. The determined contours or the enclosed 2D ROIs may be analyzed to select a target contour. For instance, among the determined contours, the contour enclosing the largest area may be selected as the target contour. As another example, among the determined contours, the contour enclosing the largest 2D ROI may be selected as the target contour.

The VOI determination module 404 may determine the preliminary VOI based on the target contour. In some embodiments, the preliminary VOI may include at least part of the 3D ROI. For example, part of the 3D ROI may be outside of the preliminary VOI. More description regarding the formation of the preliminary VOI may be found elsewhere in the present disclosure. See, e.g., FIGS. 7 and 8 and the description thereof.

The shape determination module 406 may determine a preliminary shape. The shape determination module 406 may determine a 2D image of the plurality of 2D images (herein after referred to as a "2D target image"). The preliminary shape may be determined based on an intersection of the preliminary VOI and the 2D target image. The preliminary shape may be the shape of the resulting cross section when the 2D target image intersects the ROI. More description regarding the determination of the preliminary shape may be found elsewhere in the present disclosure. See, e.g., FIGS. 6, 9 and 10 and the description thereof.

The matrix determination module 408 may determine a transformation matrix. The transformation matrix may correspond to a transformation operation. The transformation operation may transform the preliminary shape to a target shape relating to the 3D ROI such that the target shape completely encloses the 2D ROI in the 2D target image. The preliminary shape and the target shape may be in the same plane (e.g., the plane of 2D target image). In some embodiments, the transformation matrix may be determined based on the preliminary shape and the target shape. The transformation matrix may include a translation matrix, a rotation matrix, a zooming matrix, or the like, or any combination thereof. More description regarding the determination of the transformation matrix may be found elsewhere in the present disclosure. See, e.g., FIGS. 11-14 and the description thereof.

The VOI transformation module 410 may determine a transformed VOI. The transformed VOI may be determined based on the preliminary VOI and the transformation matrix. A transformation operation may be performed, based on the transformation matrix, on the preliminary VOI for transforming the preliminary VOI to the transformed VOI. The transformed VOI may completely enclose the 3D ROI. The transformation operation may include a translation operation, a rotation operation, a zooming operation, or the like, or any combination thereof.

The information acquisition module 412 may obtain information relating to the 3D ROI based on the transformed VOI. The 3D ROI and/or VOI may include a plurality of voxels. The information may include statistic information, e.g., voxel values of voxels, the largest voxel value among the voxels, the volume of the 3D ROI (relating to the volume of the corresponding lesion), a grey-scale histogram, or the like, or any combination thereof.

It should be noted that the above description of the processing device 120 is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the matrix determination module 408 and the VOI transformation module 410 may be integrated into one single module to perform their functions.

Figure 5A:
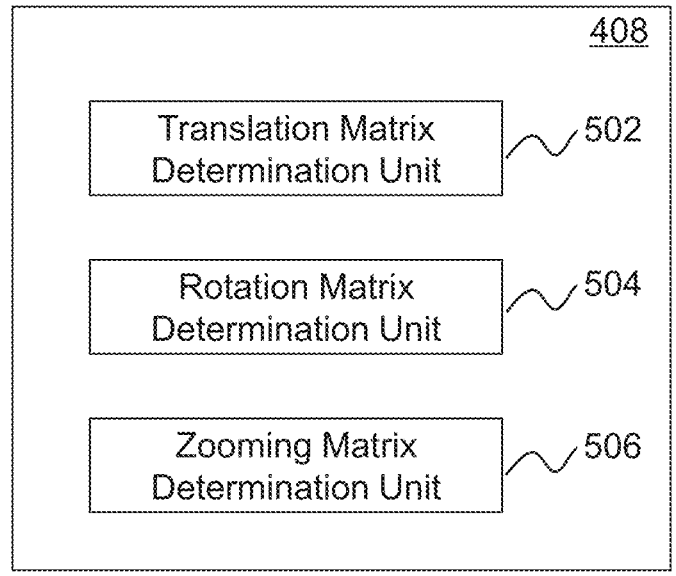
FIG. 5A is a schematic diagram illustrating an exemplary matrix determination module according to some embodiments of the present disclosure.

FIG. 5A is a schematic diagram illustrating an exemplary matrix determination module 408 according to some embodiments of the present disclosure. The matrix determination module 408 may include a translation matrix determination unit 502, a rotation matrix determination unit 504, and a zooming matrix determination unit 506. At least a portion of the matrix determination module 408 may be implemented on a computing device as illustrated in FIG. 2 or a mobile device as illustrated in FIG. 3.

The translation matrix determination unit 502 may determine a translation matrix. The translation matrix may correspond to a translation operation. The translation operation may refer to moving each point in a shape by a distance in a direction. The translation operation may be performed on a preliminary shape to provide a target shape. The translation operation may be performed on a preliminary VOI to provide a transformed VOI. The translation matrix determination unit 502 may determine the translation matrix based on the preliminary shape and the target shape.

The rotation matrix determination unit 504 may determine a rotation matrix. The rotation matrix may correspond to a rotation operation. The rotation operation may refer to rotating a shape. The rotation operation may be performed on a preliminary shape to provide a target shape. The rotation operation may be performed on a preliminary VOI to provide a transformed VOI. The rotation matrix determination unit 504 may determine the rotation matrix based on the preliminary shape and the target shape.

The zooming matrix determination unit 506 may determine a zooming matrix. The zooming matrix may correspond to a zooming operation. The zooming operation may refer to zooming a dimension of a shape for obtaining a zoomed dimension. The zooming of a dimension may refer to enlarging or reducing the dimension. The zooming operation may be performed on a preliminary shape to provide a target shape. The zooming operation may be performed on a preliminary VOI to provide a transformed VOI. The zooming matrix determination unit 506 may determine the zooming matrix based on the preliminary shape and the target shape.

Figure 5B:
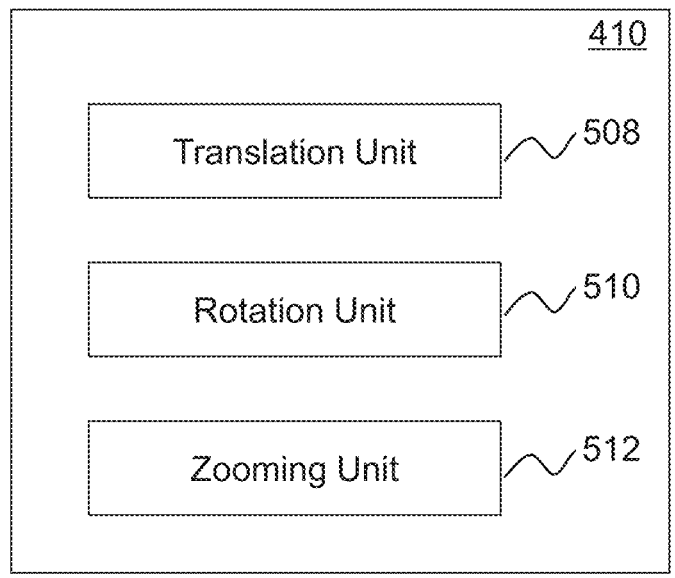
FIG. 5B is a schematic diagram illustrating an exemplary VOI transformation module according to some embodiments of the present disclosure.

FIG. 5B is a schematic diagram illustrating an exemplary VOI transformation module 410 according to some embodiments of the present disclosure. The VOI transformation module 410 may include a translation unit 508, a rotation unit 510, and a zooming unit 512. At least a portion of the VOI transformation module 410 may be implemented on a computing device as illustrated in FIG. 2 or a mobile device as illustrated in FIG. 3. Similar to the three units of the matrix determination module 408, the three units of the VOI transformation module 410 may transform the preliminary VOI based on a translation operation, a rotation operation, and a zooming operation, respectively. The translation unit 508 may transform the preliminary VOI based on a translation operation to provide a transformed VOI. The rotation unit 510 may transform the preliminary VOI based on a rotation operation to provide a transformed VOI. The zooming unit 512 may transform the preliminary VOI based on a zooming operation to provide a transformed VOI.

It should be noted that the above description of the matrix determination module 408 and the VOI transformation module 410 are merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 6:
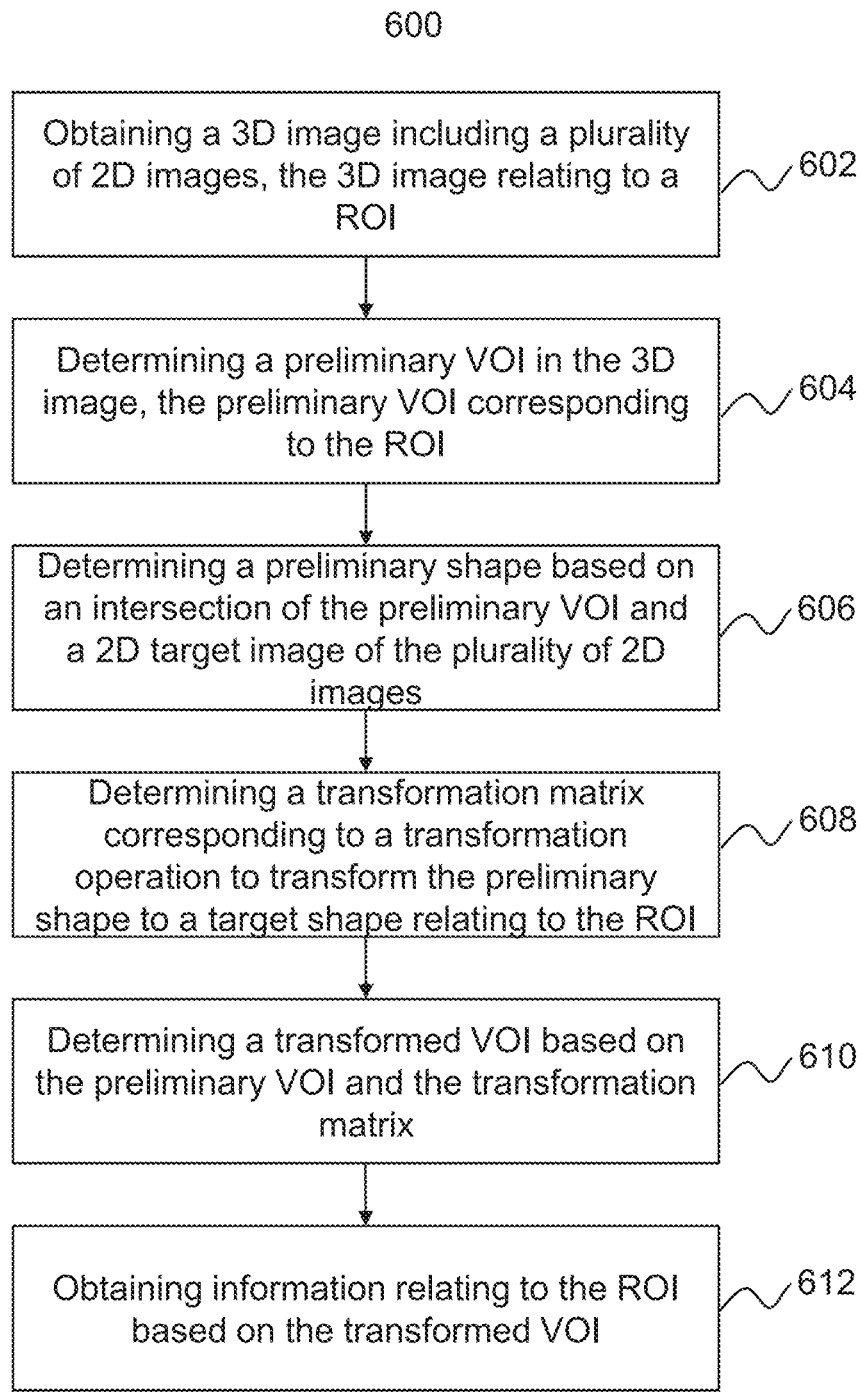
FIG. 6 is an exemplary flowchart illustrating a process for determining a transformed VOI according to some embodiments of the present disclosure.

FIG. 6 is an exemplary flowchart illustrating a process 600 for determining a transformed VOI according to some embodiments of the present disclosure. In some embodiments, the processing device 120 may perform the process 600 to determine the transformed VOI. In some embodiments, one or more operations of the process 600 illustrated in FIG. 6 for determining the transformed VOI may be implemented in the image processing system 100 illustrated in FIG. 1A or FIG. 1B. For example, the process 600 illustrated in FIG. 6 may be stored in the storage device 130 in the form of instructions, and invoked and/or executed by the processing device 120 (e.g., the processor 210 of the computing device 200 as illustrated in FIG. 2, the CPU 340 of the mobile device 300 as illustrated in FIG. 3).

In 602, a 3D image may be obtained. In some embodiments, the 3D image may be obtained by the image acquisition module 402. In some embodiments, the 3D image may include a plurality of 2D images. The plurality of 2D images may be parallel to each other. Merely by way of example, each 2D image may be a CT image slice, an MRI image slice, a PET image slice, or the like. The 2D image may be an image reconstructed by the processing device 120. The 2D image may be an image obtained from a local storage device (e.g., the storage device 130) or an external storage device. The 2D images may be presented in grayscale or color. The 3D image including the plurality of 2D images may include a 3D ROI. The 3D ROI may be associated with a lesion of an object (e.g., a patient). The lesion may include, e.g., a localized area of disease, a chief site of a generalized disease or infection, an area of a defect, or the like, or a combination.

In 604, a preliminary VOI in the 3D image may be determined. In some embodiments, the preliminary VOI in the 3D image may be determined by the VOI determination module 404. The preliminary VOI may correspond to the 3D ROI. In some embodiments, the preliminary VOI may include at least part of the 3D ROI. For example, part of the 3D ROI is located outside of the preliminary VOI. The preliminary VOI may be determined based on the 3D ROI. More description of the preliminary VOI may be found elsewhere in the present disclosure. See, e.g., FIGS. 4, 7, and 8 and the description thereof.

In 606, a preliminary shape may be determined based on an intersection of the preliminary VOI and a 2D target image selected from the plurality of 2D images. In some embodiments, the preliminary shape may be determined by the shape determination module 406. The preliminary shape may be the shape of the resulting cross section when the 2D target image intersects the preliminary VOI.

In some embodiments, the preliminary VOI, the 3D image, and the plurality of 2D images may be positioned in a coordinate system. The coordinate system may include an x axis, a y axis, and a z axis. The coordinate system may include three orthogonal planes, an x-y plane, an x-z plane, and a y-z plane. In some embodiments, a 2D image of the plurality of 2D images may be parallel to one of the x-y plane, the x-z plane, or the y-z plane. Accordingly, the preliminary shape may be in a cross section in the 2D target image parallel to one of the x-y plane, the x-z plane, or the y-z plane. In some embodiments, a 2D image of the plurality of 2D images may be parallel to neither of the x-y plane, the x-z plane, or the y-z plane. The preliminary shape may be in a cross section in the 2D target image parallel to neither of the x-y plane, the x-z plane, or the y-z plane.

In some embodiments, the 2D target image may be determined based on areas of 2D ROIs in the 2D images. For the plurality of 2D images, the areas of the 2D ROIs may be ranked. The ranking result may include a largest area, a second largest area, a least area, or the like, or any combination thereof. The 2D target image may be associated with a 2D ROI with the largest area, a 2D ROI with the second largest area, a 2D ROI with the least area, or the like, among the plurality of 2D images.

In some embodiments, for each of at least one 2D image, a shape (referred to as an intersecting shape) may be determined based on the intersection between the preliminary VOI and the 2D image. The 2D target image may be determined based on the intersecting shapes and the corresponding 2D ROIs in the same 2D images. For at least one of these 2D images, the intersecting shape may be different from the corresponding 2D ROI of the 2D image. For instance, the intersecting shape in a 2D image may include only part of the 2D ROI in the 2D image. The difference may be assessed in terms of a difference in area between the intersecting shape and the 2D ROI. For the plurality of 2D images, the differences in area between the intersecting shapes and the 2D ROIs may be ranked. The ranking result may include a largest difference in area, a second largest difference in area, a least difference in area, or the like, or any combination thereof.

In some embodiments, the 2D target image may be determined based on the ranking result. For example, the 2D target image may be the 2D image in which the difference in area between the intersecting shape and the 2D ROI is the largest, the second largest area, the least, or the like, among the plurality of 2D images.

In 608, a transformation matrix may be determined. The transformation matrix may correspond to a transformation operation. The transformation operation may transform the preliminary shape to a target shape relating to the 3D ROI. Specifically, the target shape may relate to the 2D ROI in the 2D target image. The target shape may completely enclose and be slightly larger than the 2D ROI in the 2D target image (or referred to as the 2D target ROI for brevity). For instance, if a dimension of the target shape is decreased, the resulting shrunken target shape encloses only part of the 2D ROI. Merely by way of example, the target shape is an oval having a long axis and a short axis; if the dimension of the target shape along the long axis is decreased, the resulting shrunken target shape encloses only part of the 2D ROI; if the dimension of the target shape along the short axis is decreased, the resulting shrunken target shape encloses only part of the 2D ROI. In some embodiments, the transformation matrix may be determined by the matrix determination module 408.

As described in connection with 606, the preliminary shape may be different from the 2D target ROI. The transformation operation may transform the preliminary shape to a target shape such that the target shape completely encloses the 2D target ROI. The preliminary shape and the target shape may be in the same plane (e.g., the plane of the 2D target image). As used herein, a shape is considered to completely enclose a 2D ROI in a same plane (e.g., in the plane of the 2D target image) if the boundary of the 2D ROI coincides with or is within the boundary of the shape. For instance, a shape is considered to completely enclose a 2D ROI in a same plane if the entire boundary of the 2D ROI is within the boundary of the shape. As another example, a shape is considered to completely enclose a 2D ROI in a same plane if the entire boundary of the 2D ROI coincide with the boundary of the shape. As a further example, a shape is considered to completely enclose a 2D ROI in a same plane if a portion of the boundary of the 2D ROI coincides with a portion of the boundary of the shape, and the remaining portion of the boundary of the 2D ROI is within the boundary of the shape. In some embodiments, the transformation matrix may be determined based on the preliminary shape and the target shape.

In some embodiments, the preliminary shape needs to be subject to a translation movement, rotation, zooming, or a combination thereof, so that the preliminary shape is transformed to the target shape. For instance, the preliminary shape may need to be zoomed in one or more directions. The zooming in different directions may be to the same extent or to different extents. In some embodiments, the center of the preliminary shape may be moved (by way of translation) by a distance in a direction to coincide with or in the vicinity of the center of the target shape. A translation matrix may be determined based on the translation movement. The preliminary shape may be rotated within the same plane where it is located by a rotation angle such that the alignment of the preliminary shape is the same as or similar to the alignment of the target shape. The alignment of a shape (e.g., the preliminary shape or the target shape) may be defined based on one or more axes of the shape. Merely by way of example, the preliminary shape or the target shape is an oval, the alignment of the preliminary shape of the target shape may be defined by the long axis and the short axis of the oval. A rotation matrix may be determined based on the rotation. One or more dimensions of the preliminary shape may be zoomed to be equal to the corresponding one or more dimensions of the target shape. A zooming matrix may be determined based on the zooming. More description regarding the transformation may be found in elsewhere in the present disclosure. See, e.g., FIGS. 11-14 and the description thereof. The transformation matrix may be determined based on the transformation on the basis of which the preliminary shape is transformed to the target shape.

In some embodiments, a plurality of preliminary shapes may be obtained when a plurality of 2D target images intersects the preliminary VOI. Each of at least part of the plurality of preliminary shapes may correspond to a target 2D image. For each of at least part of the plurality of preliminary shapes, a corresponding transformation matrix may be determined similarly by transforming the preliminary shape to a corresponding target shape. The transformation matrix may be determined by weighting the plurality of corresponding matrices. In some embodiments, a plurality of cells may be displayed on the communication device 140. A cell may correspond to a display area. One cell may display the 3D image. Each of one or more other cells may display one of the plurality of preliminary shapes.

In 610, a transformed VOI may be determined based on the preliminary VOI and the transformation matrix. In some embodiments, the transformed VOI may be determined by the VOI transformation module 410. A transformation operation based on the transformation matrix may be performed on the preliminary VOI for transforming the preliminary VOI to the transformed VOI. The transformation operation may include a translation operation, a rotation operation, a zooming operation, or the like, or any combination thereof. The transformed VOI may completely enclose the 3D ROI. As used herein, a VOI is considered to completely enclose a 3D ROI if the boundary of the 3D ROI coincides with or is within the boundary of the VOI. For instance, a VOI is considered to completely enclose a 3D ROI if the entire boundary of the 3D ROI is within the boundary of the VOI. As another example, a VOI is considered to completely enclose a 3D ROI if the entire boundary of the 3D ROI coincides with the boundary of the VOI. As a further example, a VOI is considered to completely enclose a 3D ROI if a portion of the boundary of the 3D ROI coincides with a portion of the boundary of the VOI, and the remaining portion of the boundary of the 3D ROI is within the boundary of the VOI.

In 612, information relating to the 3D image may be obtained based on the transformed VOI. In some embodiments, the information may be obtained by the information acquisition module 412. The information relating to the 3D ROI may correspond to information relating to the lesion of the object. The information relating to the lesion of the object may be determined by determining information relating to the transformed VOI. The information relating to the lesion of the object and/or the information relating to the transformed VOI may include statistic information including, e.g., voxel values of voxels, the largest voxel value of voxels, the volume of the 3D ROI (relating to the volume of a lesion corresponding to the 3D ROI), a grey-scale histogram, or the like, or any combination thereof. The information may be used for further analysis relating to the 3D ROI. In some embodiments, the information may be used for segmenting the 3D ROI.

In some embodiments, the 3D image, the preliminary VOI, the preliminary shape, the transformation matrix, the transformed VOI, and/or the information relating to the transformed VOI may be presented on the graphic user interface of the communication device 140. The graphic user interface may be implemented on a user device. The image processing system 100 may communicate with the user device to provide information to or receive information from the user device. The user device may generate a presentation relating to the communication on the graphic user interface displayed on the user device. A user may provide a user input or instruction via the graphic user interface by a specific interactive apparatus such as a mouse, a stylus, a keyboard, a touchpad, a microphone, or a portion of the user (e.g., a finger, a portion of a hand of the user), etc. In some embodiments, the user device may include components (e.g., an application, a sensor, or the like, or a combination thereof) such that a user may provide a user input or instruction in the form of a voice input, a gesture, etc. The user input or instruction may relate to the 3D region of interest (ROI) corresponding to a lesion of an object, the 3D image, the plurality of 2D images, the preliminary VOI, the preliminary shape, the 2D target image, the target shape, the transformation matrix, the transformed VOI, or the like, or a combination thereof. The user device may then transmit the user input or instruction to the processing device 120. For example, the user may determine the target shape by specifying how to transform the preliminary shape the user specifies via the graphic user interface. The user device may transmit the target shape to the processing device 120. The processing device 120 may determine the transformation matrix based on the target shape and the preliminary shape.

It should be noted that the above descriptions about the processing of determining the transformed VOI are provided for illustration purposes, and should not be designated as the only practical embodiment. For persons having ordinary skills in the art, after understanding the general principle of the process for determining the transformed VOI, without departing the principle, may modify or change the forms or details of the particular practical ways and steps, and further make simple deductions or substitutions, or may make modifications or combinations of some steps without further creative efforts. However, those variations and modifications do not depart the scope of the present disclosure. In some embodiments, 606 and 608 may be combined into one operation. In some embodiments, one or more operations may be added to the flowchart or be omitted from the flowchart. For example, 612 may be omitted.

Figure 7:
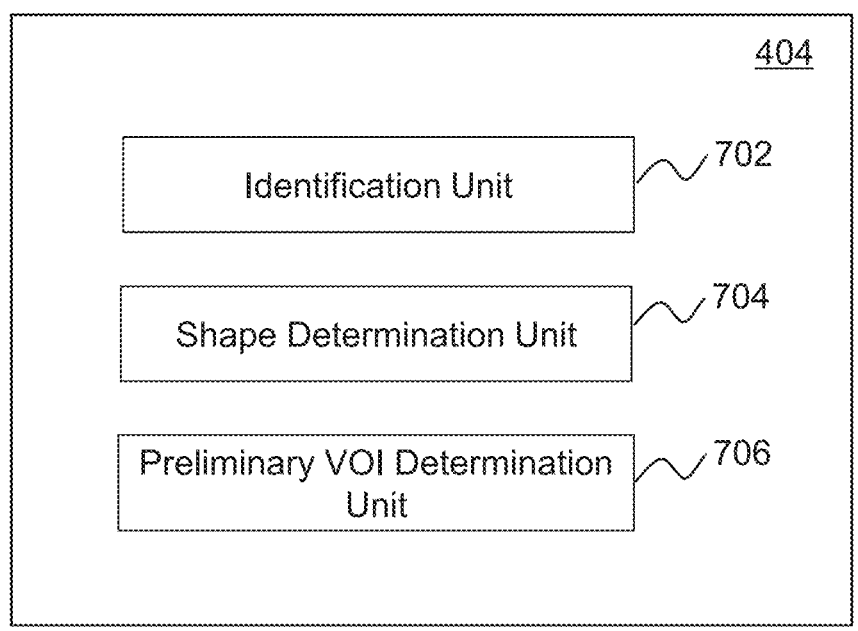
FIG. 7 is a schematic diagram illustrating an exemplary VOI determination module 404 according to some embodiments of the present disclosure.

FIG. 7 is a schematic diagram illustrating an exemplary VOI determination module 404 according to some embodiments of the present disclosure. The VOI determination module 404 may include an identification unit 702, a shape determination unit 704, and a preliminary VOI determination unit 706. At least a portion of the VOI determination module 404 may be implemented on a computing device as illustrated in FIG. 2 or a mobile device as illustrated in FIG. 3.

The identification unit 702 may identify, from the plurality of 2D images, a 2D image including a 2D ROI corresponding to a lesion of an object. At least one of the plurality of 2D images may each include a 2D ROI corresponding to the lesion. In some embodiments, the 3D ROI may be located in only a portion of the 3D image, e.g., a center portion of the 3D image; accordingly, among the plurality of 2D images, at least one 2D image does not include a 2D ROI. The identification unit 702 may identify a 2D image including a 2D ROI corresponding to the lesion of the object based on an area of the 2D ROI.

The shape determination unit 704 may determine, in a 2D plane of a 2D image, a contour relating to the lesion. In some embodiments, the contour may include at least part of or complete enclose the 2D ROI in the 2D image. The contour may be a circle, an oval, a rectangle, a square, a polygon, or the like, or any combination thereof. The shape determination unit 704 may determine, in one or more 2D planes each of which includes a 2D ROI, one or more contours. The shape determination unit 704 may select a target contour. More description regarding the selection of the target contour may be found elsewhere in the present disclosure. See, e.g., relevant description of FIG. 4.

The preliminary VOI determination unit 706 may determine the preliminary VOI based on the target contour. In some embodiments, the preliminary VOI determination unit 706 may determine the preliminary VOI by performing a transformation operation based on target contour. For example, the preliminary VOI determination unit 706 may rotate the target contour about a point (e.g., a center of the target contour), a line (e.g., an axis of the target contour), etc.

It should be noted that the above description of the VOI determination module 404 is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the identification unit 702 and the shape determination unit 704 may be integrated into one single unit to perform their functions.

Figure 8:
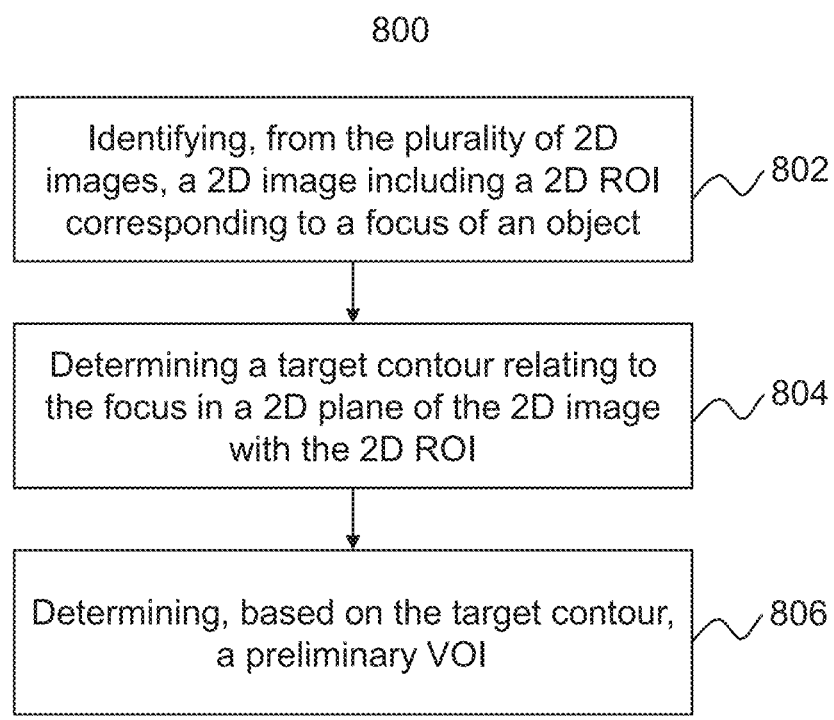
FIG. 8 is an exemplary flowchart illustrating a process for determining a preliminary VOI according to some embodiments of the present disclosure.

FIG. 8 is an exemplary flowchart illustrating a process 800 for determining a preliminary VOI according to some embodiments of the present disclosure. In some embodiments, the VOI determination module 404 may determine the preliminary VOI. In some embodiments, one or more operations of the process 800 illustrated in FIG. 8 for determining the preliminary VOI may be implemented in the image processing system 100 illustrated in FIG. 1A or FIG. 1B. For example, the process 800 illustrated in FIG. 8 may be stored in the storage device 130 in the form of instructions, and invoked and/or executed by the processing device 120 (e.g., the processor 210 of the computing device 200 as illustrated in FIG. 2, the CPU 340 of the mobile device 300 as illustrated in FIG. 3).

In 802, a 2D image including the 2D ROI corresponding to the lesion of the object may be identified from the plurality of 2D images. The 2D image including the 2D ROI may be identified by the identification unit 702. Each of at least one of the plurality of 2D images may include a 2D ROI. The 2D ROI may be determined based on an intersection of the 3D ROI and a 2D image. The 2D ROI may correspond to the lesion of the object. One or more 2D images each of which includes a 2D ROI may be identified.

In some embodiments, the identified 2D ROIs may be ranked based on their respective areas. The ranking result may include a 2D ROI with the largest area, a 2D ROI with the second largest area, a 2D ROI with the least area, or the like, or any combination thereof. In some embodiments, a 2D candidate image including a 2D ROI with an area (e.g., the largest area, the second largest area, the least area) may be identified based on the ranking result.

In 804, a target contour relating to the lesion may be determined in a 2D plane of a 2D image with a 2D ROI (e.g., the 2D candidate image). The target contour may be determined by the shape determination unit 704. For each of the one or more 2D ROIs, a contour may be determined. In some embodiments, the target contour may completely enclose the 2D ROI in the corresponding 2D image. The target contour may be a circle, an oval, a rectangle, a square, a polygon, or the like, or any combination thereof. From the one or more contours, the target contour may be selected based on features of the contour or features of the 2D ROI enclosed by the contour. More description regarding the determination of a contour, features thereof, or the selection of the target contour may be found elsewhere in the present disclosure. See, e.g., FIG. 4 and the description thereof.

In 806, a preliminary VOI may be determined based on the target contour relating to the lesion. The preliminary VOI may be determined by the preliminary VOI determination unit 706. Merely by way of example, if the target contour is an oval, the preliminary VOI may be determined by rotating the oval about a rotation axis (e.g., the minor axis of the oval, the major axis of the oval). If the target contour is one other than an oval (e.g., a circle, a polygon, a rectangle, a square), the preliminary VOI may be determined by rotating the target contour about a rotation axis (e.g., a symmetrical axis of the target contour), a rotation center (e.g., a geometric center of the target contour, a mass center of the target contour), by forming a cuboid, a cone, etc., based on the target contour, or the like, or a combination thereof.

It should be noted that the above descriptions about the processing of determining the preliminary VOI are provided for illustration purposes, and should not be designated as the only practical embodiment. For persons having ordinary skills in the art, after understanding the general principle of the process for determining the preliminary VOI, without departing the principle, may modify or change the forms or details of the particular practical ways and steps, and further make simple deductions or substitutions, or may make modifications or combinations of some steps without further creative efforts. However, those variations and modifications do not depart the scope of the present disclosure.

Figure 9:
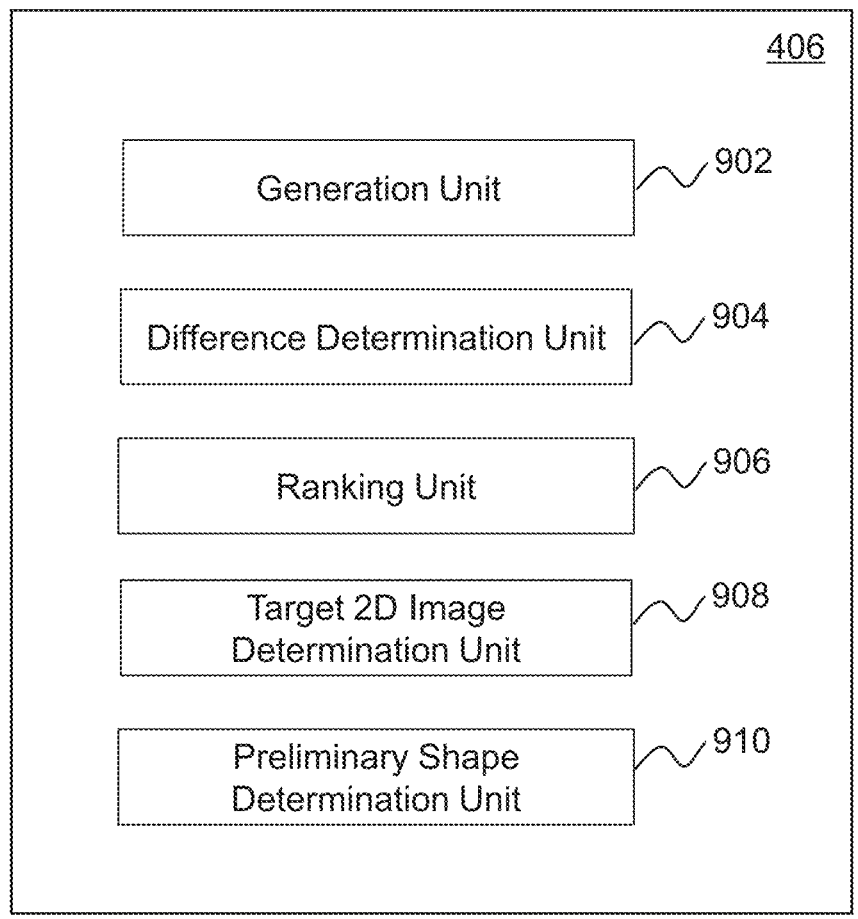
FIG. 9 is a schematic diagram illustrating an exemplary shape determination module according to some embodiments of the present disclosure.

FIG. 9 is a schematic diagram illustrating an exemplary shape determination module 406 according to some embodiments of the present disclosure. The shape determination module 406 may include a generation unit 902, a difference determination unit 904, a ranking unit 906, a target 2D image determination unit 908, and a preliminary shape determination unit 910. At least a portion of the shape determination module 406 may be implemented on a computing device as illustrated in FIG. 2 or a mobile device as illustrated in FIG. 3.

The generation unit 902 may generate a plurality of intersecting shapes. The plurality of intersecting shapes may be generated based on the preliminary VOI and the plurality of 2D images. An intersecting shape may be a shape of a resulting cross section when a 2D image intersects the preliminary VOI.

The difference determination unit 904 may determine a difference between an intersecting shape and a 2D ROI in a same 2D image. The 2D ROIs may be determined by intersections between the 3D ROI and the plurality of 2D images. In some embodiments, the difference may relate to the area of a 2D ROI in a 2D image and the area enclosed by the intersecting shape in the same 2D image. See, e.g., FIG. 6 and the description thereof.

The ranking unit 906 may determine a ranking result by ranking the differences determined by the difference determination unit 904. A difference may be assessed in terms of a difference in area between the intersecting shape and the 2D ROI. For the plurality of 2D images, the differences in area between the intersecting shapes and the 2D ROIs may be ranked. The ranking result may include a largest difference in area, a second largest difference in area, a least difference in area, or the like, or any combination thereof.

The target 2D image determination unit 908 may determine a 2D target image. The 2D target image may be determined based on the ranking result.

The preliminary shape determination unit 910 may determine a preliminary shape. The preliminary shape may be determined based on the target 2D image and the preliminary VOI. The preliminary shape may be the intersecting shape of the preliminary VOI and the 2D target image.

It should be noted that the above description of the shape determination module 406 is merely provided for the purpose of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the difference determination unit 904 and the ranking unit 906 may be integrated into one single unit to perform their functions.

Figure 10:
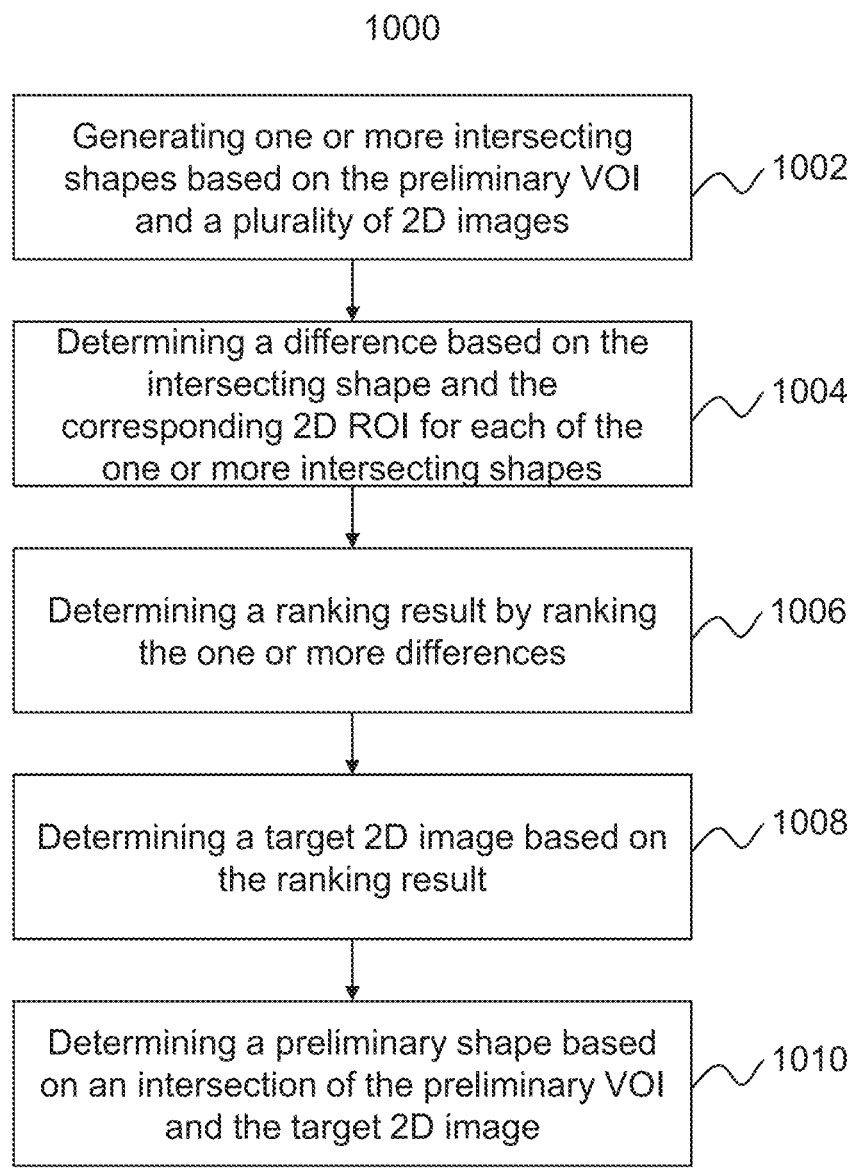
FIG. 10 is an exemplary flowchart illustrating a process for determining a preliminary shape based on a two-dimensional (2D) target image and a preliminary VOI according to some embodiments of the present disclosure.

FIG. 10 is an exemplary flowchart illustrating a process 1000 for determining a preliminary shape based on a 2D target image and a preliminary VOI according to some embodiments of the present disclosure. In some embodiments, the shape determination module 406 may determine the preliminary shape. In some embodiments, one or more operations of the process 1000 illustrated in FIG. 10 for determining the preliminary VOI may be implemented in the image processing system 100 illustrated in FIG. 1A or FIG. 1B. For example, the process 1000 illustrated in FIG. 10 may be stored in the storage device 130 in the form of instructions, and invoked and/or executed by the processing device 120 (e.g., the processor 210 of the computing device 200 as illustrated in FIG. 2, the CPU 340 of the mobile device 300 as illustrated in FIG. 3).

In 1002, one or more intersecting shapes may be generated based on the preliminary VOI and a plurality of 2D images. The one or more intersecting shapes may be generated by the generation unit 902. An intersecting shape may be a shape of a resulting cross section when a 2D image intersects the preliminary VOI. In some embodiments, for each of at least one of the plurality of 2D images, an intersecting shape may be generated based on the preliminary VOI and the 2D image.

In 1004, a difference may be determined based on the intersecting shape and the corresponding 2D ROI for each of one or more intersecting shapes. The difference may be determined by the difference determination unit 904. A 2D ROI may be determined by an intersection of the 3D ROI and a 2D image of the plurality of 2D images. A difference may be assessed in terms of a difference in area between the intersecting shape in a 2D image and the corresponding 2D ROI in the 2D image.

In 1006, a ranking result may be determined by ranking the one or more differences. The ranking result may be determined by the ranking unit 906. The ranking result may include a largest difference in area, a second largest difference in area, a least difference in area, or the like, or any combination thereof.

In 1008, a 2D target image may be determined based on the ranking result. The 2D target image may be determined by the target 2D image determination unit 908. For example, the 2D target image may be the 2D image in which the difference in area between the intersecting shape and the 2D ROI is the largest, the second largest area, the least, or the like, among the plurality of 2D images.

In 1010, a preliminary shape may be determined based on an intersection of the preliminary VOI and the target 2D image. The preliminary shape may be determined by the preliminary shape determination unit 910. The preliminary shape may be the intersecting shape of the preliminary VOI and the 2D target image.

It should be noted that the above descriptions about the processing of determining the preliminary shape are provided for illustration purposes, and should not be designated as the only practical embodiment. For persons having ordinary skills in the art, after understanding the general principle of the process for determining the preliminary shape, without departing the principle, may modify or change the forms or details of the particular practical ways and steps, and further make simple deductions or substitutions, or may make modifications or combinations of some steps without further creative efforts. However, those variations and modifications do not depart the scope of the present disclosure. For example, as described in connection with 604, the target 2D image may be associated with a 2D ROI with the largest area, the second largest area, the least area, or the like.

Figure 11:
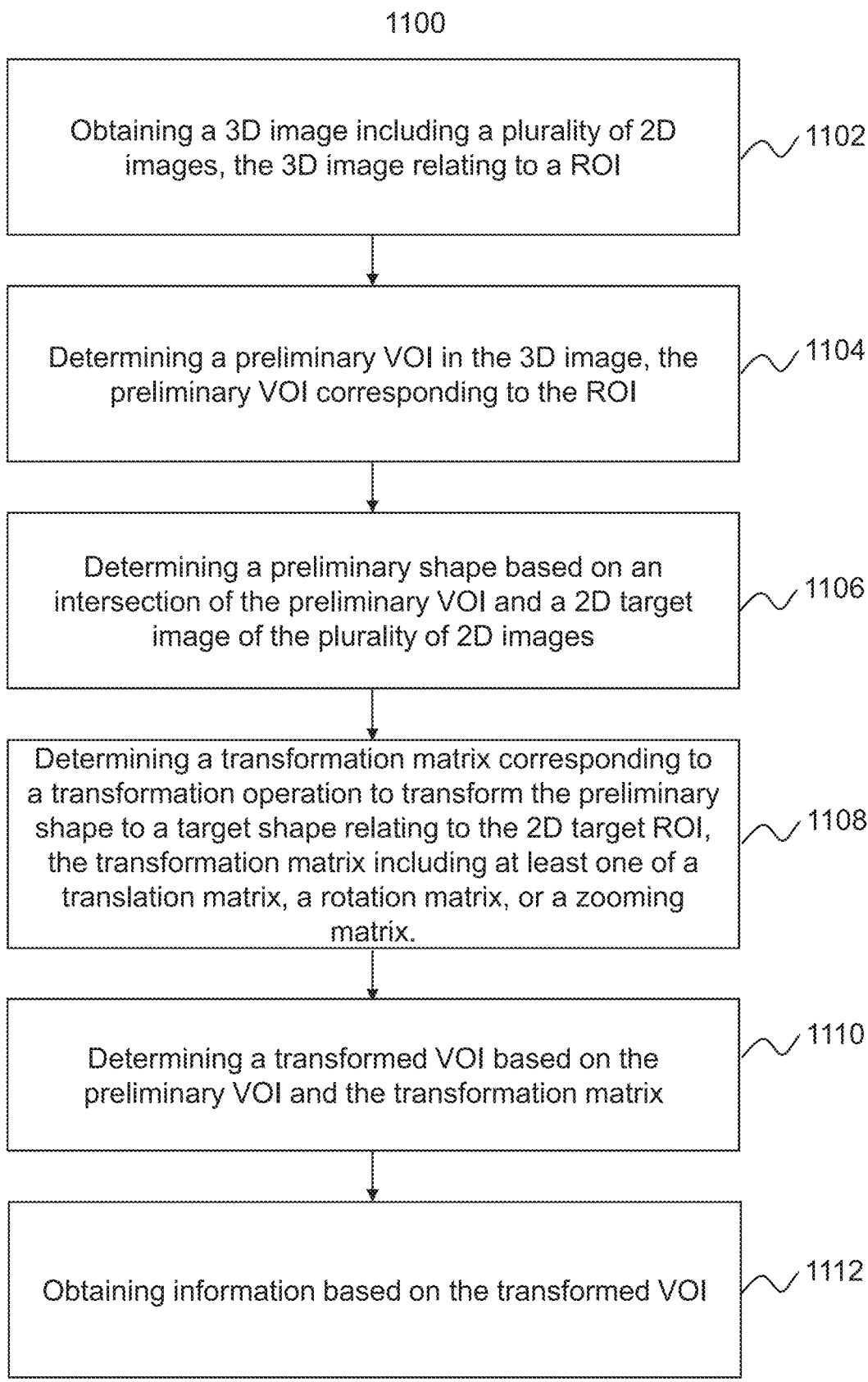
FIG. 11 is an exemplary flowchart illustrating a process for determining a transformed VOI according to some embodiments of the present disclosure.

FIG. 11 is an exemplary flowchart illustrating a process 1100 for determining a transformed VOI according to some embodiments of the present disclosure. In some embodiments, the processing device 120 may determine the transformed VOI. The process for determining a transformed VOI may include obtaining a 3D image including a plurality of 2D images relating to a 3D region of interest (ROI) 1102; determining a preliminary VOI corresponding to the 3D ROI in the 3D image 1104; determining a preliminary shape based on an intersection of the preliminary VOI and a 2D target image of the plurality of 2D images 1106; determining a transformation matrix corresponding to a transformation operation to transform the preliminary shape to a target shape relating to the 2D target ROI 1108, the transformation matrix may include at least one of a translation matrix, a rotation matrix, a zooming matrix; determining a transformed VOI based on the preliminary VOI and the transformation matrix 1110; and obtaining information based on the transformed VOI 1112. Operations 1102, 1104, and 1106 may be the same as or similar to 602, 604, and 606, respectively, described in connection with FIG. 6 and not repeated herein.

In 1108, a transformation matrix may be determined. As described in connection with 608, the transformation operation may include a translation operation, a rotation operation, a zooming operation, or the like, or any combination thereof. The transformation matrix may include a translation matrix, a rotation matrix, a zooming matrix, or the like, or any combination thereof. In some embodiments, one or more operations of the translation operation, the rotation operation, or the zooming operation may be performed on the preliminary shape to provide a target shape.

Operations 1110 and 1112 may be the same as or similar to 610 and 612, respectively, described in connection with FIG. 6 and not repeated herein.

Figure 12:
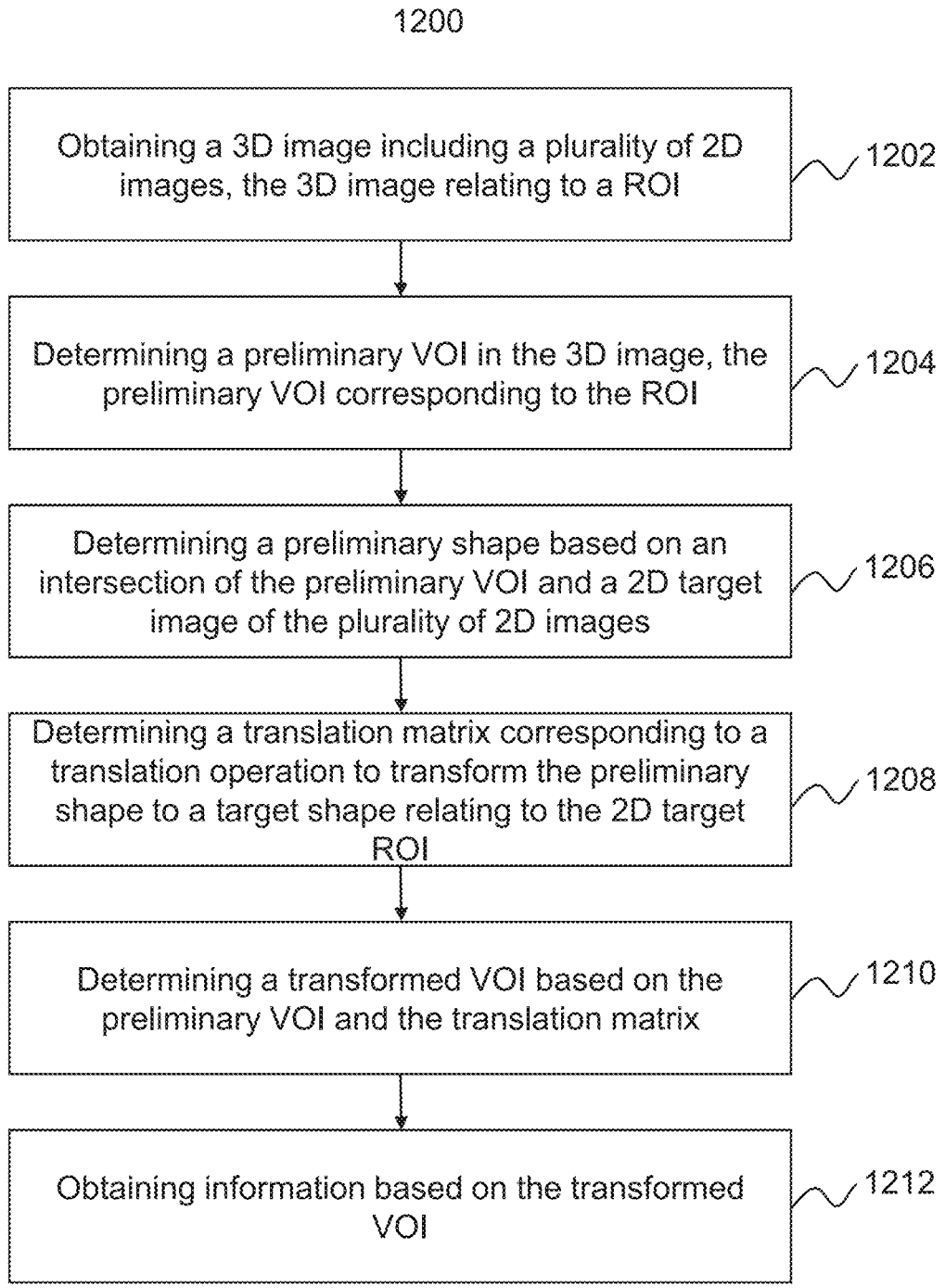
FIG. 12 is an exemplary flowchart illustrating a process for determining a transformed VOI based on a translation operation according to some embodiments of the present disclosure.

FIG. 12 is an exemplary flowchart illustrating a process 1200 for determining a transformed VOI based on a translation operation according to some embodiments of the present disclosure. In some embodiments, the processing device 120 may determine the transformed VOI. The process for determining a transformed VOI based on a translation operation may include obtaining a 3D image including a plurality of 2D images relating to a 3D region of interest (ROI) 1202; determining a preliminary VOI corresponding to the 3D ROI in the 3D image 1204; determining a preliminary shape based on an intersection of the preliminary VOI and a 2D target image of the plurality of 2D images 1206; determining a translation matrix corresponding to the translation operation to transform the preliminary shape to a target shape relating to the 2D target ROI 1208; determining a transformed VOI based on the preliminary VOI and the translation matrix 1210; and obtaining information based on the transformed VOI 1212.

Operations 1202, 1204, and 1206 may be the same as or similar to 602, 604, and 606, respectively, described in connection with FIG. 6 and not repeated herein.

In 1208, a translation matrix may be determined. The translation matrix may correspond to a translation operation. The translation operation may transform the preliminary shape to provide a target shape relating to the 2D target ROI. The translation operation may refer to moving each point in the preliminary shape by a distance in a direction. In some embodiments, the translation matrix may be determined by the matrix determination module 408 (e.g., the translation matrix determination unit 502).

As described in connection with 606, the preliminary shape may be different from the 2D target ROI. The translation operation may transform the preliminary shape to a target shape such that the target shape completely encloses the 2D target ROI. The preliminary shape and the target shape may be in the same plane (e.g., the plane of the 2D target image).

In some embodiments, the translation matrix may be determined based on the preliminary shape and the target shape. In some embodiments, the center of the preliminary shape may be moved (by way of translation) by a distance in a direction to coincide with or in the vicinity of the center of the target shape. A translation matrix may be determined based on the translation movement. In some embodiments, a first point relating to the preliminary shape and a second point relating to the first point on the target shape may be determined. For example, the first point may be on the preliminary shape and the second point may be on the target shape and correspond to the first point. As another example, the first point may be the center of the preliminary shape. The second point may be the center of the target shape.

In some embodiments, the first coordinates of the first point and the second coordinates of the second point may be determined accordingly. The translation matrix may be determined based on the first coordinates and the second coordinates. For instance, the translation matrix may be the offset between the first point and the second point. In some embodiments, a plane where the preliminary shape and the target shape locate may be parallel to neither of the x-y plane, x-z plane, or the y-z plane. The translation matrix may be three-dimensional.

In 1210, the transformed VOI may be determined based on the preliminary VOI and a translation operation corresponding to the translation matrix. For example, the preliminary VOI may be moved by a distance in a direction. The direction and the direction may be determined based on the translation matrix. The transformed VOI may completely enclose the 3D ROI.

Operation 1212 may be the same as or similar to 612 described in connection with FIG. 6 and not repeated herein.

Figure 13:
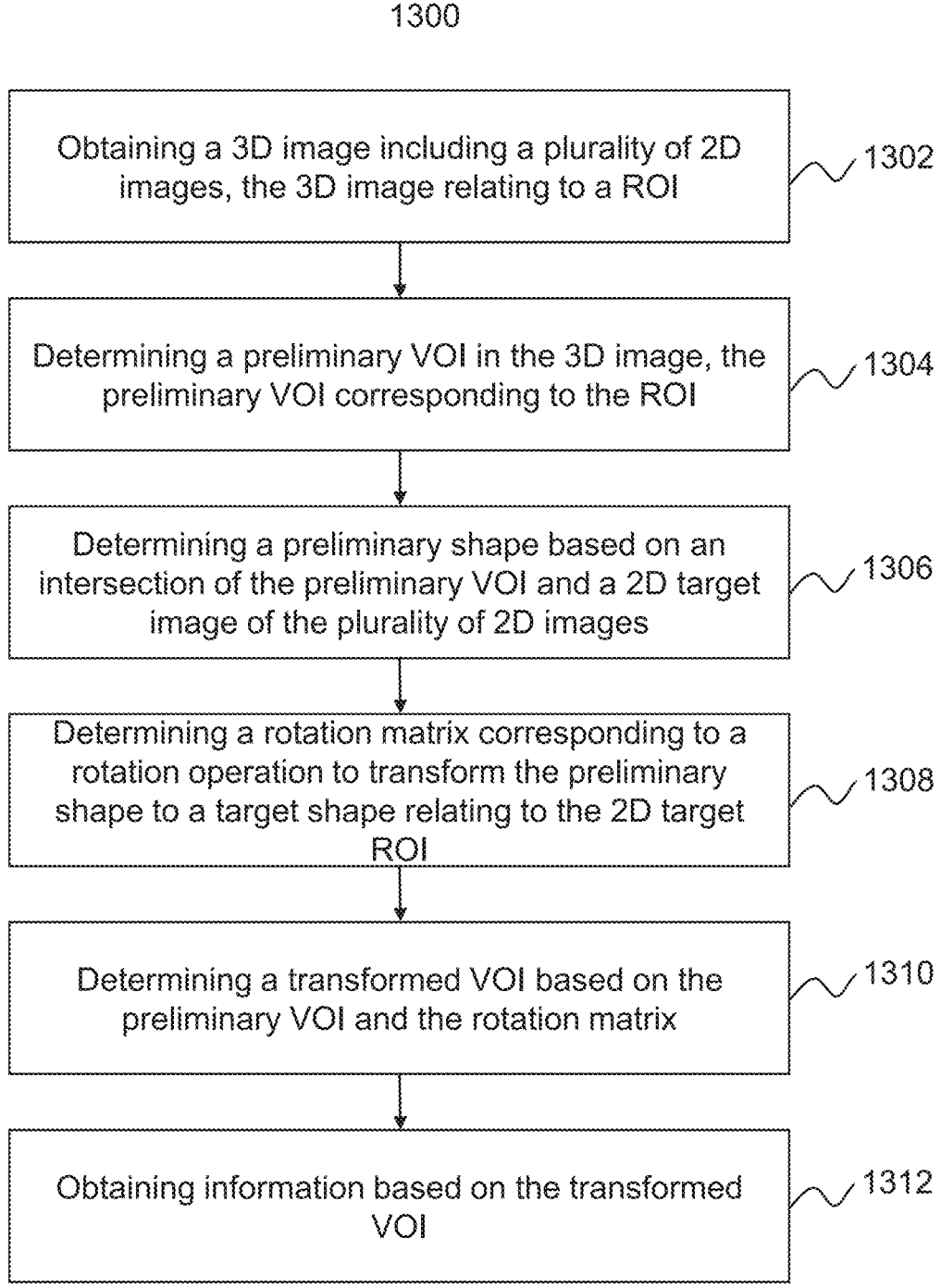
FIG. 13 is an exemplary flowchart illustrating a process for determining a transformed VOI based on a rotation operation according to some embodiments of the present disclosure.

FIG. 13 is an exemplary flowchart illustrating a process 1300 for determining a transformed VOI based on a rotation operation according to some embodiments of the present disclosure. In some embodiments, the processing device 120 may determine the transformed VOI. The process for determining a transformed VOI based on a rotation operation may include obtaining a 3D image including a plurality of 2D images relating to a 3D region of interest (ROI) 1302; determining a preliminary VOI corresponding to the 3D ROI in the 3D image 1304; determining a preliminary shape based on an intersection of the preliminary VOI and a 2D target image of the plurality of 2D images 1306; determining a rotation matrix corresponding to the rotation operation to transform the preliminary shape to a target shape relating to the 2D target ROI 1308; determining a transformed VOI based on the preliminary VOI and the rotation matrix 1310; and obtaining information based on the transformed VOI 1312.

Operations 1302, 1304 and 1306 may be the same as or similar to 602, 604, and 606, respectively, described in connection with FIG. 6 and not repeated herein.

In 1308, a rotation matrix may be determined. The rotation matrix may correspond to a rotation operation. The rotation operation may transform the preliminary shape to provide a target shape relating to the 2D target ROI. The rotation operation may refer to rotating each point on the preliminary shape through the same angle about a point (e.g., the center of the preliminary shape). In some embodiments, the rotation matrix may be determined by the matrix determination module 408 (e.g., the rotation matrix determination unit 504).

As described in connection with 606, the preliminary shape may be different from the 2D target ROI. The rotation operation may transform the preliminary shape to a target shape such that the target shape completely encloses the 2D target ROI. The preliminary shape and the target shape may be in the same plane (e.g., the plane of the 2D target image).

In some embodiments, the rotation matrix may be determined based on the preliminary shape and the target shape. The preliminary shape may be rotated within the same plane where it is located by a rotation angle such that the alignment of the preliminary shape is the same as or similar to the alignment of the target shape. The alignment of a shape (e.g., the preliminary shape or the target shape) may be defined based on one or more axes of the shape. Merely by way of example, the preliminary shape or the target shape is an oval, the alignment of the preliminary shape of the target shape may be defined by the long axis and the short axis of the oval. A rotation matrix may be determined based on the rotation.

In 1310, the transformed VOI may be determined based on the preliminary VOI and a rotation operation corresponding to the rotation matrix. In some embodiments, the transformed VOI may be determined by rotating the preliminary VOI through the rotation angle in a plane where the preliminary VOI is located. The transformed VOI may completely enclose the 3D ROI.

Operation 1312 may be the same as or similar to 612 described in connection with FIG. 6 and not repeated herein.

Figure 14:
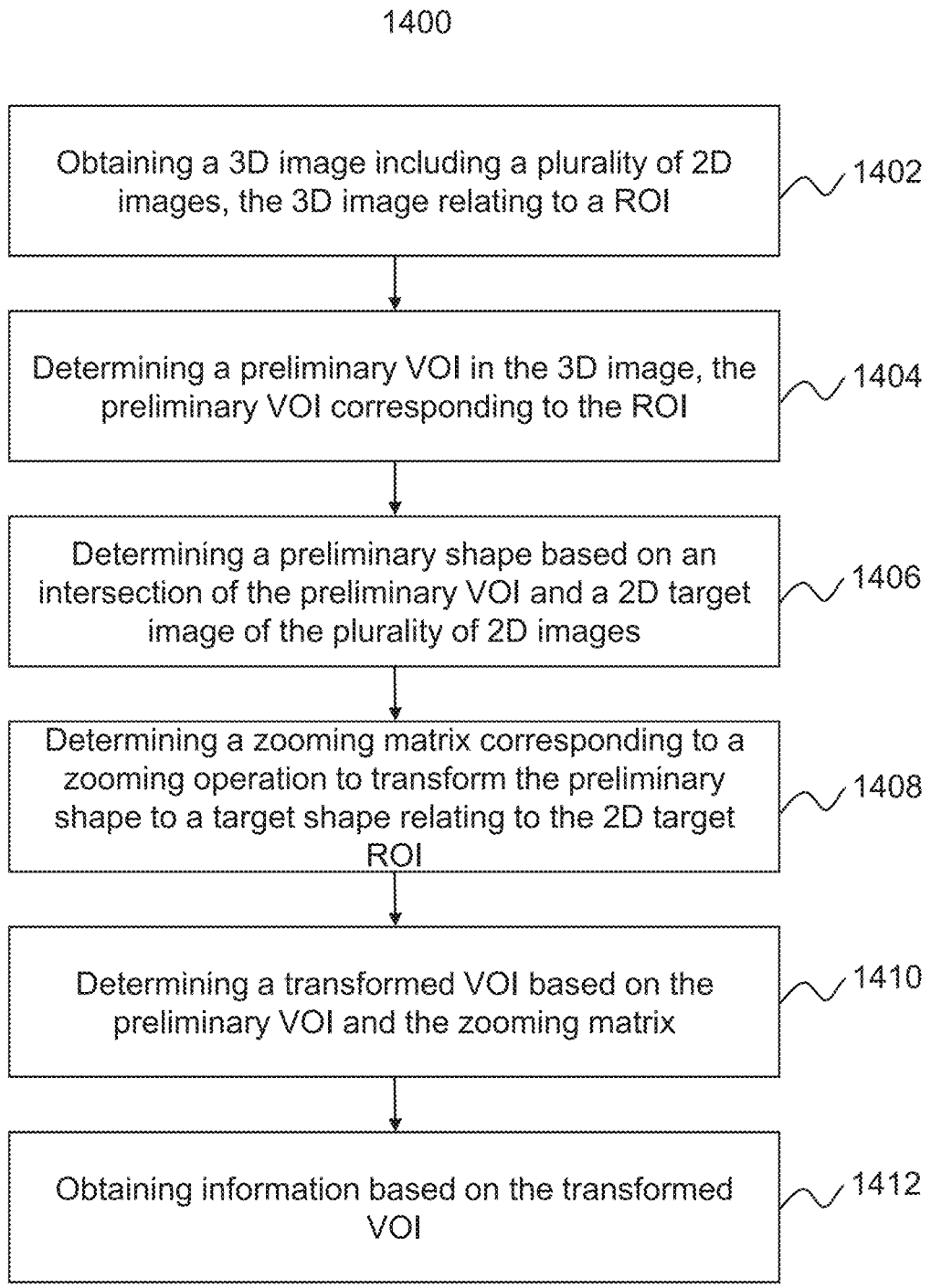
FIG. 14 is an exemplary flowchart illustrating a process for determining a transformed VOI based on a zooming operation according to some embodiments of the present disclosure.

FIG. 14 is an exemplary flowchart illustrating a process 1400 for determining a transformed VOI based on a zooming operation according to some embodiments of the present disclosure. In some embodiments, the processing device 120 may determine the transformed VOI. The process for determining a transformed VOI based on a zooming operation may include obtaining a 3D image including a plurality of 2D images relating to a 3D region of interest (ROI) 1402; determining a preliminary VOI corresponding to the 3D ROI in the 3D image 1404; determining a preliminary shape based on an intersection of the preliminary VOI and a 2D target image of the plurality of 2D images 1406; determining a zooming matrix corresponding to the zooming operation to transform the preliminary shape to a target shape relating to the 2D target ROI 1408; determining a transformed VOI based on the preliminary VOI and the zooming matrix 1410; and obtaining information based on the transformed VOI 1412.

Operations 1402, 1404 and 1406 may be the same as or similar to 602, 604, and 606, respectively, described in connection with FIG. 6 and not repeated herein.

In 1408, a zooming matrix may be determined. The zooming matrix may correspond to a zooming operation. The zooming operation may transform the preliminary shape to provide a target shape relating to the 2D target ROI. The zooming operation may refer to zooming a dimension of the preliminary shape (herein after referred to as "original dimension") for obtaining a zoomed dimension. The zooming of a dimension may refer to enlarging or reducing the dimension. Merely by way of example, the preliminary shape is an oval, and the original dimensions may be described in terms of a length along the major axis (or long axis) of the oval and a length along the minor axis (or short axis) of the oval. In some embodiments, if the preliminary shape is a polygon, the original dimensions may be the lengths of the sides of the polygon. As another example, the preliminary shape is a circle, the original dimension may be a radius of the circle. In some embodiments, the zooming matrix may be determined by the matrix determination module 408 (e.g., the zooming matrix determination unit 506).

As described in connection with 606, the preliminary shape may be different from the 2D target ROI. The zooming operation may transform the preliminary shape to a target shape such that the target shape completely encloses the 2D target ROI. The preliminary shape and the target shape may be in the same plane (e.g., the plane of the 2D target image).

In some embodiments, the zooming matrix may be determined based on the preliminary shape and the target shape. At least one dimension of the preliminary shape may be zoomed to be equal to the corresponding dimension of the target shape to provide a zooming matrix. In some embodiments, all dimensions of the preliminary shape may be zoomed to transform the preliminary shape to the target shape. In some embodiments, at least one dimension of the preliminary shape is not zoomed and remains unchanged between the preliminary shape and the target shape. In some embodiments, a ratio of a zoomed dimension to the original dimension may be obtained. The preliminary shape may be defined by a plurality of original dimensions. Accordingly, a plurality of ratios may be determined. An unchanged dimension of the preliminary shape compared to the target shape may correspond to the ratio of 1. The zooming matrix may be determined based on the zooming.

In 1410, the transformed VOI may be determined based on the preliminary VOI and a zooming operation corresponding to the zooming matrix. In some embodiments, the transformed VOI may be determined by zooming one or more dimensions of the preliminary VOI based on the zooming matrix. In some embodiments, one or more remaining dimensions of the preliminary VOI may remain constant. Each of the plurality of the dimensions may be zoomed or remain unchanged based on a ratio associated with the zooming matrix. The transformed VOI may completely enclose the 3D ROI.

Operation 1412 may be the same as or similar to 612 described in connection with FIG. 6 and not repeated herein.

Some embodiments of the present disclosure provides systems and methods for determining transformed volume of interest (VOI) by performing a transformation operation on a preliminary VOI. A preliminary shape may be determined based on the preliminary VOI and a 2D image relating to a lesion of an object. A 2D lesion corresponding to the 2D image may be outside the preliminary shape. The preliminary shape may be transformed into a target shape and the target shape may include the 2D lesion. As a result, the transformation operation may be determined accordingly. The transformed VOI may include a 3D region of interest (ROI) corresponding to the lesion of the object. Thus, the identification of such a 3D region of ROI closely corresponding to a lesion of the object using the transformation operation may improve the accuracy of information relating to the lesion determined based on the transformed VOI, which in turn may improve accuracy and/or efficiency of diagnosis and/or treatment. For instance, information relating to the lesion determined based on the transformed VOI may include voxel values of voxels, the largest voxel value among the voxels, the volume of the 3D ROI (relating to the volume of the corresponding lesion), a grey-scale histogram, or the like, or a combination thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

What is claimed is:

1. A system, comprising:
   at least one storage device including a set of instructions for determining a volume of interest (VOI); and
   at least one processor configured to communicate with the at least one storage device, wherein when executing the set of instructions, the at least one processor is configured to cause the system to:
   obtain a three-dimensional (3D) image including a plurality of two-dimensional (2D) images, the 3D image relating to a 3D region of interest (ROI) corresponding to a lesion of an object;
   determine a preliminary VOI in the 3D image based on a target contour of a first 2D ROI that corresponds to an intersecting shape of one of the plurality of 2D images with the 3D ROI;
   determine a preliminary shape based on an intersection of the preliminary VOI and a 2D target image of the plurality of 2D images, wherein the 2D target image includes a target shape of a second 2D ROI that corresponds to an intersecting shape of the 2D target image and the 3D ROI;

determine a transformation matrix corresponding to an operation to transform the preliminary shape to the target shape, wherein the transformation matrix includes at least one of a translation matrix, a rotation matrix, or a zooming matrix; and determine a transformed VOI based on the preliminary VOI and the transformation matrix.

2. The system of claim 1, wherein to determine the preliminary VOI in the 3D image, the at least one processor is further configured to cause the system to:

identify; from the plurality of 2D images, a 2D image with the first 2D ROI corresponding to the lesion;

determine the target contour corresponding to the lesion in a plane of the 2D image; and determine the preliminary VOI based on the target contour.

3. The system of claim 1, wherein to determine the transformation matrix corresponding to an operation to transform the preliminary shape to the target shape, the at least one processor is further configured to cause the system to:

determine the transformation matrix based on the preliminary shape and the target shape.

4. The system of claim 1, wherein the at least one processor is further configured to cause the system to:

determine information relating to the transformed VOI.

5. The system of claim 4, wherein the information relating to the transformed VOI includes at least one of voxel values of voxels in the transformed VOI, a largest voxel value of the voxels in the transformed VOI, a volume of the 3D ROI, or a grey-scale histogram relating to the 3D ROI.

6. The system of claim 5, wherein the at least one processor is further configured to cause the system to:

communicate with a user device that generates a presentation relating to the communication on a graphic user interface displayed on the user device; or provide at least a portion of the information to the user device to be presented on the graphic user interface displayed on the user device.

7. The system of claim 6, wherein the at east one processor is further configured to cause the system to:

receive, via the graphic user interface, a user instruction relating to at least one of the 3D region of interest (ROI) corresponding to a lesion of an object, the 3D image, the plurality of 2D images; the preliminary VOI, the preliminary shape, the 2D target image; the target shape, the transformation matrix, or the transformed VOI.

8. The system of claim 1, wherein the operation includes at least one of a translation operation, a rotation operation, or a zooming operation.

9. The system of claim 8, wherein the translation matrix relates to the translation operation, the rotation matrix relates to the rotation operation, or the zooming matrix relates to the zooming operation.

10. A method implemented on at least one computing device each of which has one or more processors and one or more storage devices, the method comprising:

obtaining a three-dimensional (3D) image including a plurality of two-dimensional (2D) images, the 3D image relating to a 3D region of interest (ROI) corresponding to a lesion of an object;

determining a preliminary VOI in the 3D image based on a target contour of a first 2D ROI that corresponds to an intersecting shape of one of the plurality of 2D images with the 3D ROI;

determining a preliminary shape based on an intersection of the preliminary VOI and a 2D target image of the plurality of 2D images, wherein the 2D target image includes a target shape of a second 2D ROI that corresponds to an intersecting shape of the 2D target image and the 3D ROI;

determining a transformation matrix corresponding to an operation to transform the preliminary shape to the target shape, wherein the transformation matrix includes at least one of a translation matrix, a rotation matrix, or a zooming matrix; and determining a transformed VOI based on the preliminary VOI and the transformation matrix.

11. The method of claim 10, wherein the determining the preliminary VOI in the 3D image comprises:

identifying, from the plurality of 2D images, a 2D image with the first 2D ROI corresponding to the lesion; and determining the target contour corresponding to the lesion in a plane of the 2D image; and determining the preliminary VOI based on the target contour.

12. The method of claim 10, wherein the determining the transformation matrix corresponding to an operation to transform the preliminary shape to the target shape comprises:

determining the transformation matrix based on the preliminary shape and the target shape.

13. The method of claim 10, further comprising: determining information relating to the transformed VOI.

14. The method of claim 13, wherein the information relating to the transformed VOI includes at least one of voxel values of voxels in the transformed VOI, a largest voxel value of the voxels in the transformed VOI, a volume of the 3D ROI, or a grey-scale histogram relating to the 3D ROI.

15. The method of claim 14, wherein the method further comprises:

communicating with a user device that generates a presentation relating to the communication on a graphic user interface displayed on the user device; or providing at least a portion of the information to the user device to be presented on the graphic user interface displayed on the user device.

16. The method of claim 10, wherein the operation includes at least one of a translation operation, a rotation operation, or a zooming operation.

17. The method of claim 16, wherein the translation matrix relates to the translation operation, the rotation matrix relates to the rotation operation, or the zooming matrix relates to the zooming operation.

18. A non-transitory computer-readable medium storing instructions that, when executed by at least one processor of a system, cause the system to:

obtain a three-dimensional (3D) image including a plurality of two-dimensional (2D) images, the 3D image relating to a 3D region of interest (ROI) corresponding to a lesion of an object;

determine a preliminary VOI in the 3D image based on a target contour of a first 2D ROI that corresponds to an intersecting shape of one of the plurality of 2D images with the 3D ROI;

determine a preliminary shape based on an intersection of the preliminary VOI and a 2D target image of the plurality of 2D images, wherein the 2D target image includes a target shape of a second 2D ROI that corresponds to an intersecting shape of the 2D target image and the 3D ROI;

determine a transformation matrix corresponding to an operation to transform the preliminary shape to the target shape, wherein the transformation matrix includes at least one of a translation matrix, a rotation matrix, or a zooming matrix; and determine a transformed VOI based on the preliminary VOI and the transformation matrix.

\* \* \* \* \*